(12) United States Patent
Dhiman et al.

(10) Patent No.: US 12,046,707 B2
(45) Date of Patent: Jul. 23, 2024

(54) BATTERY CELL AND MANUFACTURE THEREOF

(71) Applicant: Rivian IP Holdings, LLC, Irvine, CA (US)

(72) Inventors: Rajeev Dhiman, Pleasanton, CA (US); Susheel Teja Gogineni, Sunnyvale, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 127 days.

(21) Appl. No.: 17/827,040

(22) Filed: May 27, 2022

(65) Prior Publication Data

US 2023/0387445 A1 Nov. 30, 2023

(51) Int. Cl.
*H01M 10/04* (2006.01)
*H01M 50/46* (2021.01)

(52) U.S. Cl.
CPC ....... *H01M 10/0404* (2013.01); *H01M 50/46* (2021.01)

(58) Field of Classification Search
CPC .................................................. H01M 10/0404
See application file for complete search history.

(56) References Cited

U.S. PATENT DOCUMENTS

2020/0044273 A1* 2/2020 Abe .................. H01M 10/0468

FOREIGN PATENT DOCUMENTS

| CN | 111628206 A | * | 9/2020 |
| CN | 114759242 A | * | 7/2022 |

OTHER PUBLICATIONS

Machine translation of CN 114759242 A (Year: 2022).*
Machine translation of CN 111628206 A (Year: 2020).*

* cited by examiner

*Primary Examiner* — Matthew T Martin
*Assistant Examiner* — Unique Jenevieve Luna
(74) *Attorney, Agent, or Firm* — Foley & Lardner LLP

(57) ABSTRACT

A system can include a first platen configured to rotate in a first direction and a second platen configured to rotate in a second direction. The first platen can include a first surface configured to support a first layer and contact a first portion of a second layer. The second platen including a second surface that mates with the first surface of the first platen to stack the first layer and the first portion of the second layer.

12 Claims, 19 Drawing Sheets

BATTERY CELL AND MANUFACTURE THEREOF

INTRODUCTION

Vehicles can use electricity to power a motor. Electricity can be provided by a battery to operate the vehicle or components thereof.

SUMMARY

A system for manufacturing a battery cell can include a first rotator and a second rotator to stack layers that can be used in a battery cell. The first rotator and the second rotator can include at least one platen that can support a first layer, such as a cathode layer. The platen of the first rotator can mate, (e.g., mesh, contact, interact, engage, or align) with the platen of the second rotator. A second layer can be provided between the first rotator and the second rotator. The second layer can be provided as a continuous sheet. The second layer can be an anode layer. The platen of the first rotator can rotate while supporting the first layer. The platen of the first rotator can mate (e.g., mesh, contact, interact, engage, or align) with the platen of the second rotator to stack the first layer with a portion of the second layer to form a stack portion. At least one separator layer can be positioned on either side of the second layer and can be disposed between the first layer and the second layer when stacked. The stack portion can be continuous or connected to other stack portions via the continuous second layer.

At least one aspect is directed to a system. The system can include a first platen configured to rotate in a first direction and a second platen configured to rotate in a second direction. The first platen can include a first surface configured to support a first layer and contact a first portion of a second layer. The second platen including a second surface that mates with the first surface of the first platen to stack the first layer and the first portion of the second layer.

At least one aspect is directed to an apparatus. The apparatus can be a battery. The battery can include a first layer, a second layer, and a third layer. The second layer can include a first portion continuous with a second portion. The first portion can be stacked with the first layer to form a first stack portion. The second portion can be stacked with the third layer to form a second stack portion.

At least one aspect is directed to a method. The method can include supporting a first layer with a first surface of a first platen. The method can include rotating the first platen in a first direction to contact a first portion of a second layer. The method can include rotating a second platen in a second direction. The second platen including a second surface. The method can also include mating the first surface of the first platen and the second surface of the second platen to stack the first layer with the first portion of the second layer.

At least one aspect is directed to a method. The method can include providing a first layer, a second layer, and a third layer. The method can include stacking the first layer with a first portion of the second layer to form a first stack portion. The method can also include stacking the third layer with a second portion of the second layer to form a second stack portion, wherein the first portion of the second layer is continuous with the second portion of the second layer.

At least one aspect is directed to a method. The method can include providing a system for manufacturing a battery. The system can include a first platen configured to rotate in a first direction and a second platen configured to rotate in a second direction. The first platen can include a first surface configured to support a first battery layer and contact a first portion of a second battery layer. The second platen can include a second surface that mates with the first surface of the first platen to stack the first battery layer and the first portion of the second battery layer.

At least one aspect is directed to a method. The method can include providing a battery. The battery can include a first layer, a second layer, and a third layer. The second layer can include a first portion continuous with a second portion. The first portion can be stacked with the first layer to form a first stack portion. The second portion can be stacked with the third layer to form a second stack portion.

At least one aspect is directed to an electric vehicle. The electric vehicle can include a batter pack. The battery pack can include a plurality of batteries. The plurality of batteries can include a first layer, a second layer, and a third layer. The second layer can include a first portion continuous with a second portion. The first portion can be stacked with the first layer to form a first stack portion. The second portion can be stacked with the third layer to form a second stack portion.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
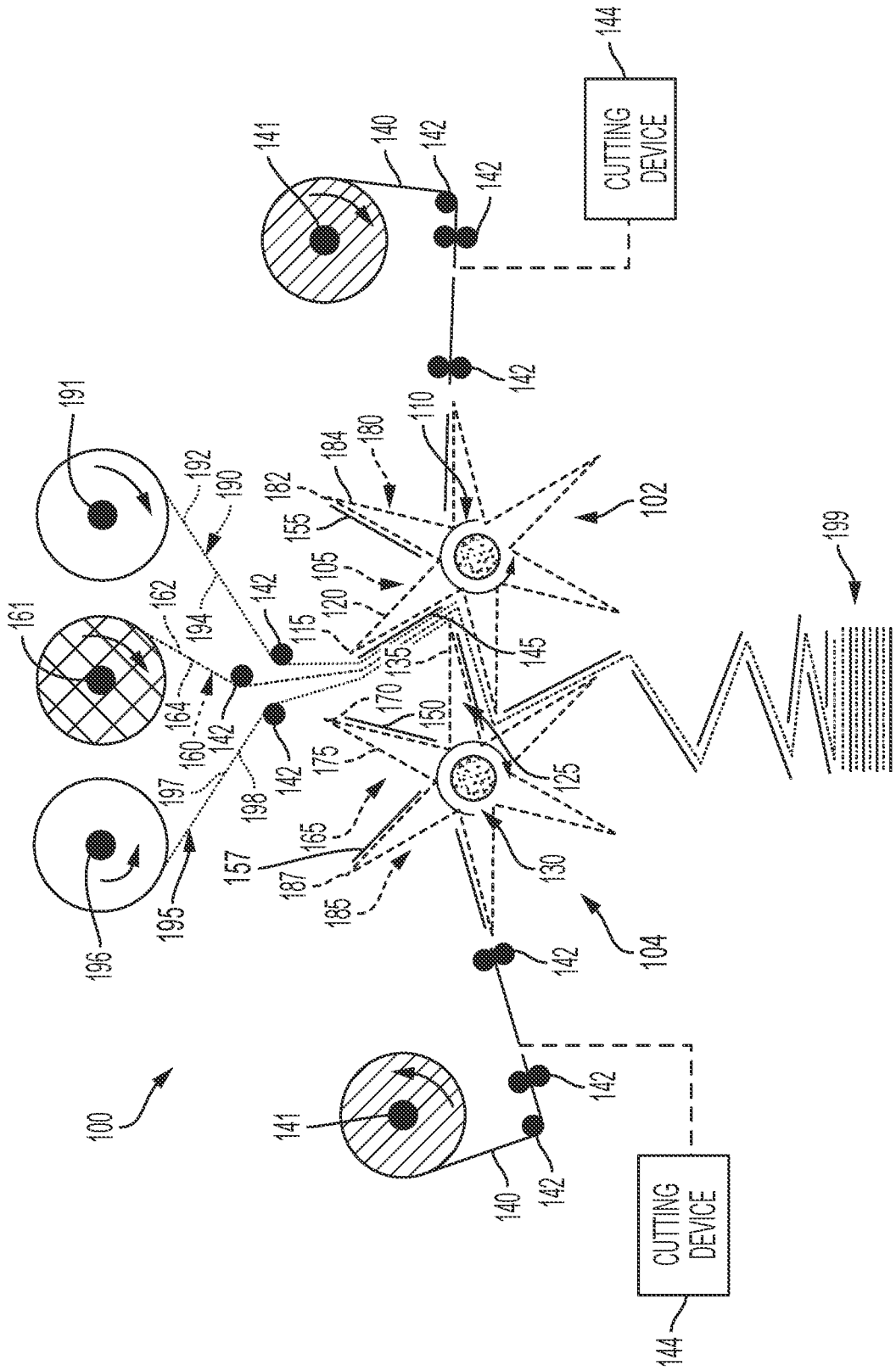
FIG. 1 depicts an example system for manufacturing a battery cell, in accordance with some aspects.

Following below are more detailed descriptions of various concepts related to, and implementations of battery cells and methods, apparatuses, and systems of the manufacture thereof. The various concepts introduced above and discussed in greater detail below may be implemented in any of numerous ways.

The present disclosure is directed to systems and methods of manufacturing a battery cell. This disclosure is generally directed to a rotary stacker system for assembling battery cell layers. The rotary stacker can stack layers that can be used in a battery cell. For example, the rotary stacker can stack an anode layer, a cathode layer, and a separator layer to form a stack of battery cell layers that can be included in a battery cell apparatus.

Rather than stacking pre-cut layers one at a time, the rotary stacker system can stack two layers (e.g., an anode and a cathode layer) simultaneously and in a continuous fashion. The rotary stacker can include two rotating and mating platens, for example a first platen rotating in a first direction and receiving a first cathode layer comprising a cathode material, and a second platen rotating in a second direction and receiving a second cathode layer comprising the cathode material. The first cathode layer and the second cathode layer can be cut to a desired size as the cathode material is fed from a roll of cathode material onto the first and second rotating platens. The first cathode layer and the second cathode layer can be placed on the first platen or the second platen and held in a desired position via mechanical design features (e.g., a raised edge on the respective platen) or vacuum pressure. An anode layer and at least one separator layer can be provided between the first and second platen. The anode layer and the separator layer can be provided in rolled form. The first and second platen can mate as they rotate such that a first surface of the first platen and a second surface of the second platen are configured to stack or sandwich multiple layers together. For example, the first and second platen can mate as they rotate to stack a cathode layer, a first separator layer, an anode layer, and a second separator layer together.

The first platen can rotate in a first direction while holding or supporting a first layer, such as a cathode layer. The first surface of the first platen can contact a first portion of a first separator layer. For example, the first surface of the first platen can contact the first portion of the first layer as the first platen rotates in a clockwise direction. The first portion of the first separator layer can contact a first portion of the second layer, such as an anode layer. The first portion of the anode layer can then contact a first portion of a second separator layer. The first side of the first platen can stack the first layer, the first portion of the first separator layer, the first portion of the second layer, and the first portion of the second separator layer against the second surface of the second platen to form a first stack portion. The first layer, the first portion of the first separator layer, the first portion of the second layer, and the first portion of the second separator layer can be joined using heat, glue, liquid surface tension, or other joining element or method. The second platen can rotate in a second direction while holding or supporting a third layer, such as a second cathode layer. A first side of the second platen can contact a second portion of the second separator layer, a second portion of the second layer, and a second portion of the first separator layer. The first surface of the second platen stack the third layer, the second portion of the second separator layer, the second portion of the second layer, and the second portion of the first separator layer against a second surface of the first platen to form a second stack portion. The third layer, the second portion of the second separator layer, the second portion of the second layer, and the second portion of the first separator layer can be joined using heat, glue, liquid surface tension, or some other joining element or method.

The first separator layer, second layer, and second separator layer of the first stack can be continuous with the first separator layer, second layer, and second separator layer of the second stack such that a continuous, layered composite can be formed. The first stack portion, the second stack portion, and subsequently-formed stack portions can be collected in a receptacle positioned beneath the first and second rotating platens. The first stack portion, second stack portion, and subsequent stack portions can zig-zag within the receptacle to form a stack. When a predetermined amount of stack portions are collected in the receptacle, the layered composite can be cut between adjacent stack portions.

The systems and methods described herein have a technical advantage of simultaneously stacking multiple layers for a battery cell rather than stacking layers individually. The disclosed solutions can produce a battery cell having a continuous battery cell layers, such as a continuous anode layer. The disclosed solutions can stack battery cell layers in a continuous fashion, rather than using discrete start-and-stop operations. The rotary stacker system can stack battery cell layers accurately and quickly, decreasing manufacture time and increasing reliability relative to an individually-stacked system.

Figure 2:
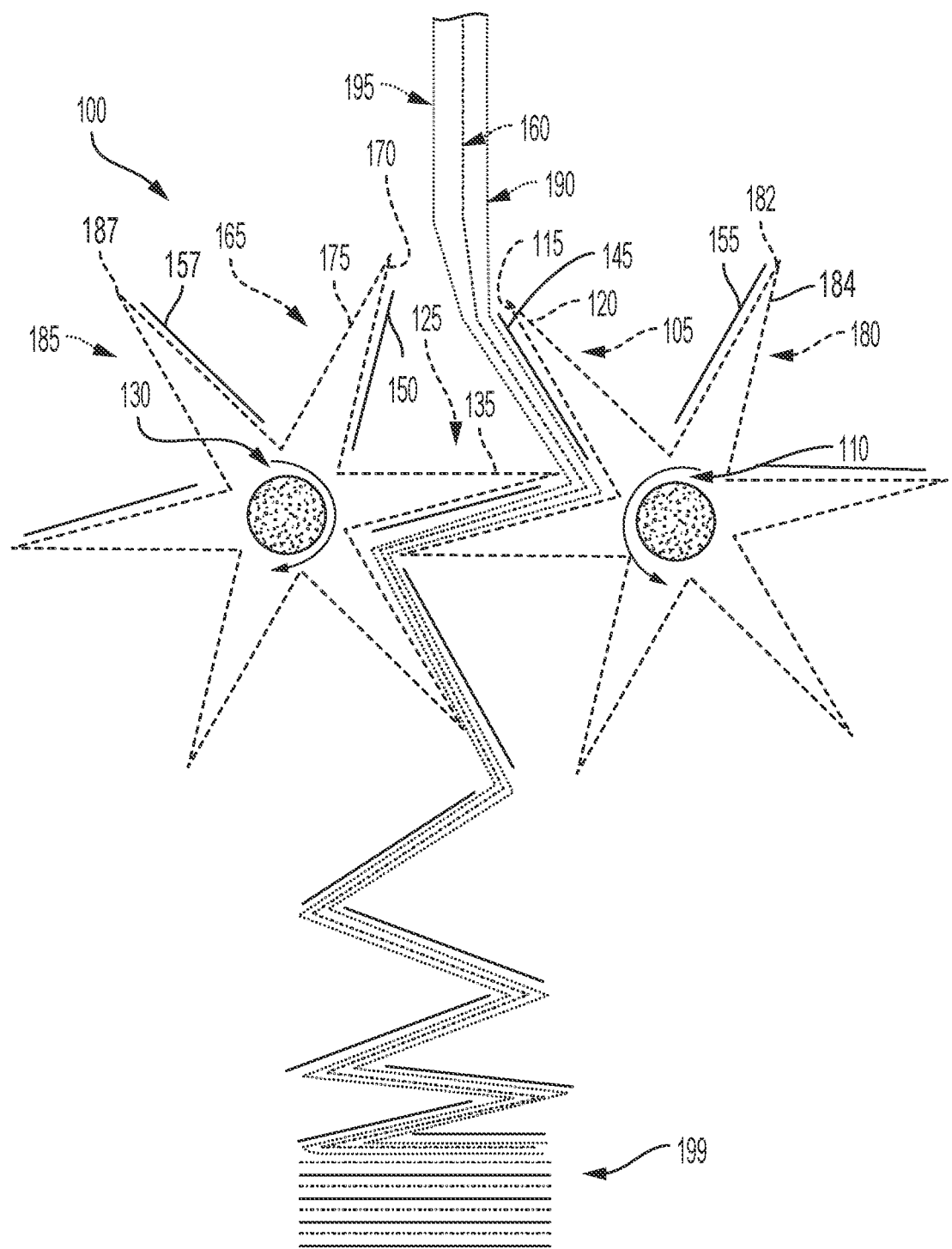
FIG. 2 depicts an example system for manufacturing a battery cell, in accordance with some aspects.
Figure 3:
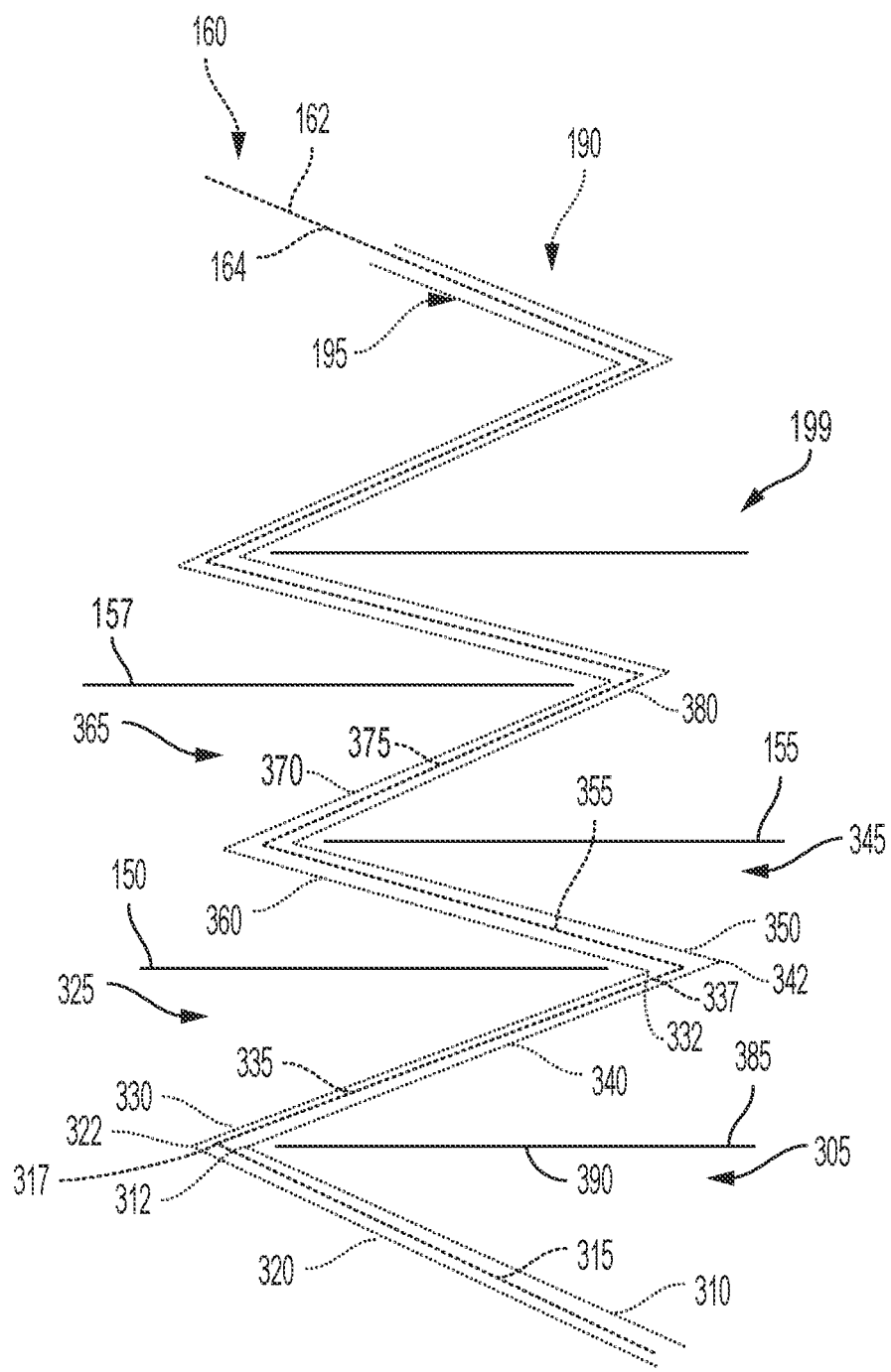
FIG. 3 depicts example layers for a battery cell, in accordance with some aspects.

FIGS. 1-3, among others, depict a system 100 for manufacturing a battery cell. For example, the system 100 can stack one or more layers for a battery cell comprising a plurality of layers. The plurality of layers can include at least one anode layer, at least one cathode layer, and at least one separator layer. For example, a battery cell can include a plurality of anode layers, a plurality of cathode layers, and a plurality of separator layers can be stacked in a particular orientation. The system 100 can stack the plurality of layers into a battery layer stack 199 so that a battery cell can be assembled with the plurality of layers in a particular orientation, as shown in FIG. 3.

The system 100 can include a first rotator 102 and a second rotator 104. The first rotator 102 can include at least one platen, and the second rotator 104 can include at least one platen. For example, each of the first rotator 102 and the second rotator 104 can include one, two, three, four, five, six, seven, eight, nine, ten platens, or more platens. Each of the platens of the first rotator 102 and the second rotator 104 can be disposed radially about the rotator, extending from a center member or hub. A gap or recess can exist between each platen of the first rotator 102 and the second rotator 104. For example, the first rotator 102 and the second rotator 104 can rotate about parallel axes. The first rotator 102 can rotate in a first direction 110 about a first axis, and the second rotator 104 can rotate in a second direction 130 about a second axis. The first direction 110 can be opposite the second direction 130. For example, the first direction 110 can be a counterclockwise direction, and the second direction 130 can be a clockwise direction. The first rotator 102 and the second rotator 104 can be positioned relative to each other such that a platen of the first rotator 102 can be received by a gap or opening between adjacent platens of the second rotator 104. A platen of the second rotator 104 can be received by a gap or opening between adjacent platens of the first rotator 102.

The system 100 can include a first material 140, a second layer 160, and at least one separator layer. For example, the system 100 can include a first separator layer 190 and a second separator layer 195. The first material 140 can comprise a first electrode material or a first battery material. The first material 140 can comprise a cathode material. For example, the first material 140 can be a first electrode material that comprises a cathode electrode material including a battery active material laminated with at least one side of a current collector foil. The second layer 160 can comprise a second electrode layer or a second battery layer. The second layer 160 can comprise an anode material. For example, the second layer 160 can include an anode electrode that includes a battery active material laminated with at least one side of a current collector foil. Each of the first separator layer 190 and the second separator layer 195 can comprise an electrolyte material. For example, the first separator layer 190 and the second separator layer 195 can include or be made of an electrolyte material such that the first separator layer 190 and the second separator layer 195 can transfer ions, cations, or anions between an adjacent cathode material (e.g., the first layer 145) and an adjacent anode material (e.g., the second layer 160) when assembled in a battery cell.

The system 100 can include the second layer 160, the first separator layer 190, and the second separator layer 195 in rolled form such that each of the second layer 160, the first separator layer 190, and the second separator layer 195 are continuous sheets of material. For example, the second layer 160 can be a continuous sheet of anode electrode material. The first separator layer 190 can be a continuous sheet of separator or electrolyte material. For example, the first separator layer 190 can be a sheet of separator material that can receive (e.g., be wetted by, be saturated with) a liquid electrolyte substance. The liquid electrolyte material can be used in liquid electrolyte batteries, for example. The first separator layer 190 can receive the liquid electrolyte material during a filling step associated with assembly of a battery cell. The first separator layer 190 can be a sheet of solid electrolyte material. For example, the first separator layer 190 can be or include a solid electrolyte material. The solid electrolyte material can be or include a solid-state electrolyte layer that can conduct ions. For example, the first separator layer 190 can be or include a solid electrolyte material that can conduct ions without receiving a separate liquid electrolyte substance. The second separator layer 195 can be a continuous sheet of separator or electrolyte material. For example, the second separator layer 195 can be a sheet of separator material that can receive (e.g., be wetted by, be saturated with) a liquid electrolyte substance. The liquid electrolyte material can be used in liquid electrolyte batteries, for example. The second separator layer 195 can receive the liquid electrolyte material during a filling step associated with assembly of a battery cell. The second separator layer 195 can be a sheet of solid electrolyte material. For example, the second separator layer 195 can be or include a solid electrolyte material. The solid electrolyte material can be or include a solid-state electrolyte layer that can conduct ions. For example, the second separator layer 195 can be or include a solid electrolyte material that can conduct ions without receiving a separate liquid electrolyte substance. The second layer 160 can be provided to the system 100 via a roll 161, the first separator layer 190 can be to the provided system 100 via a roll 191, and the second separator layer 195 can be provided to the system 100 via a roll 196. A sheet (e.g., web) of each of the second layer 160, first separator layer 190, and the second separator layer 195 can be provided to the system 100 via one or more feeder devices 142 (e.g., a web handling device, a roller, or other element). The feeder devices 142 can provide the second layer 160, the first separator layer 190, and the second separator layer 195 to the system 100 between the first rotator 102 and the second rotator 104. For example, each of the second layer 160, the first separator layer 190, and the second separator layer 195 can be provided between platens of the first rotator 102 and the second rotator 104 as a continuous sheet of material.

The system 100 can include at least one cutting device 144 to cut the first material 140. For example, the first material 140 can be cut into a layer or sheet having particular dimensions, rather than as a continuous sheet. The first material 140 can be provided to the cutting device 144 of the system 100 from at least one roll 141. The cutting device 144 can cut a sheet (e.g., layer, web, singulated layer, or portion) from the roll 141 prior to or as the first material 140 is provided to the system 100. For example, the cutting device 144 can cut at least one battery layer comprising the first material 140 from the roll 141. The cutting device 144 can be a mechanical cutter using a rolling or non-rolling blade. The cutting device 144 can be a laser cutter or other contactless cutting device. Each of the battery layers comprising the first material 140 can be provided to one of the first rotator 102 or the second rotator 104 in cut form via a feeder device 142 (e.g., web handling device, roller, or other element). For example, the system 100 can include two rolls 141 of first material 140. A first roll 141 can be cut into battery layers comprising the first material 140 by a first cutting device 144. Battery layers comprising the first material 140 cut from the first roll 141 can be provided to the first rotator 102. A second roll 141 can be cut into battery layers comprising the first material 140 by a second cutting device 144. Battery layers comprising the first material 140 cut from the second roll 141 can be provided to the second rotator 104.

The system 100 can include a first platen 105 to rotate in the first direction 110. For example, the first rotator 102 can include the first platen 105. The first platen 105 can rotate in the first direction 110. For example, the first platen 105 can rotate in the first direction 110 as the first rotator 102 rotates in the first direction 110 about the first axis. The first platen 105 can extend radially from the first rotator 102 and can be coupled therewith. For example, the first platen 105 can be fixedly coupled with the first rotator 102 via some coupling method, such as welding, swaging, etc. The first platen 105 can be removably coupled with the first rotator 102 via fasteners or some other coupling method. The first platen 105 can be integrally formed with the first rotator 102 such that the first platen 105 is a permanent member of the first rotator 102.

The system 100 can include the first platen 105 including a first surface 115. For example, the first platen 105 can include a first surface 115 that is flat, curved, stepped, textured, porous, discontinuous, or otherwise configured. The first surface 115 of the first platen 105 can include a curved or lobed surface similar to a gear tooth. The first surface 115 of the first platen 105 can be a generally flat surface comprising a friction-reducing material. For example, the first surface 115 can include a smooth surface that can allow an object (e.g., a battery electrode or layer of first material 140) to slide along the first surface 115 with minimal resistance, particularly under a gravitational force. The first surface 115 can comprise a soft or compliant material that, when contacted by another object (e.g., another platen) can temporarily compress or be deformed slightly (e.g., 0.5-5% reduction of a width of the first platen 105). The first surface 115 can comprise a fluorocarbon material, a silicon material, or another material. The first surface 115 can comprise a rigid material that does not deform or compress when contacted by another object (e.g., another platen).

Figure 5:
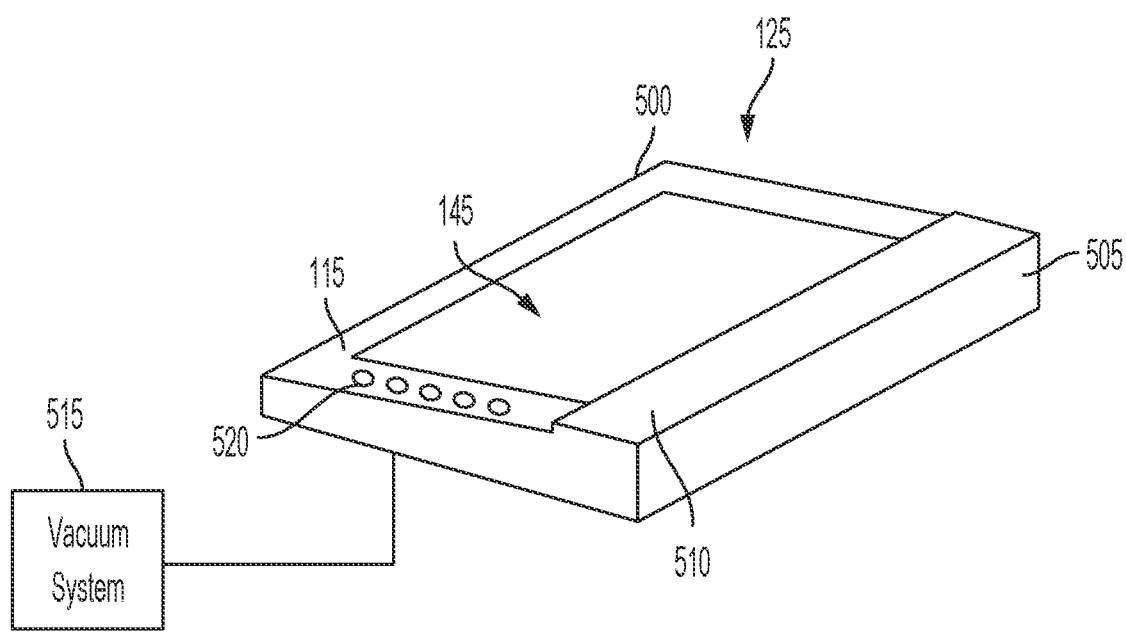
FIG. 5 depicts an example platen of a system for manufacturing a battery cell, in accordance with some aspects.

The system 100 can include the first surface 115 of the first platen 105 to support a first layer 145. For example, the first layer 145 can be cut from a roll 141 of first material 140 via the cutting device 144. The first layer 145 can be a singulated layer, such as a singulated cathode electrode layer. For example, the first layer 145 can be a cut, discontinuous, separate, or individual layer that has been cut from a roll of material. The first layer 145 can have dimensions (e.g., a length and width) that are smaller than a length or width of the first surface 115 of the first platen 105. The first surface 115 can include at least one edge, groove, impression, or other feature configured to position the first layer 145 in a particular location on the first surface 115 of the first platen 105. For example, and as shown in FIG. 5 among others, the first surface 115 can include a raised edge that can contact or interact with an edge of the first layer 145. An edge of the first layer 145 can rest against the raised edge of the first surface 115 in order to position the first layer 145 in a particular location on the first surface 115. The first surface 115 can support, hold, retain, or carry the first layer 145 on the first platen 105 as the first platen 105 rotates in the first direction 110. For example, the first layer 145 can be held on the first surface 115 of the first platen 105 as the first platen 105 rotates approximately 180 degrees from a first location where the first layer 145 is placed on the first surface 115 to a second location where the first platen 105 mates with a platen of the second rotator 104.

The system 100 can include the first surface 115 of the first platen 105 to contact a first portion 315 of the second layer 160. For example, the first surface 115 or the first layer 145 that is supported by the first surface 115 of the first platen 105 can indirectly contact the first portion 315 of the second layer 160 where another material (e.g., a portion of the first separator layer 190) is positioned between the first portion 315 of the second layer 160 and the first surface 115 or first layer 145. The first surface 115 or the first layer 145 supported by the first surface 115 can directly contact the first portion 315 of the second layer 160 in some examples. The second layer 160 can be provided to the system 100 in as a continuous sheet from a roll 161. The second layer 160 can include a first side 162 and a second side 164. The first portion 315 of the second layer 160 can be a portion of the continuous second layer 160 having a length that is approximately equal to or greater than a length or width of the first layer 145 that is positioned on the first surface 115. Because the second layer 160 can be a continuous layer, the second layer 160 can continue beyond the first portion 315. For example, the second layer 160 can extend beyond the first portion 315 towards the roll 161 or away from the roll 161.

The second layer 160 can be pliable between the first rotator 102 and the second rotator 104. For example, and because the second layer 160 is a continuous sheet, the second layer 160 can be draped or can hang between the first rotator 102 and the second rotator 104 such that the second layer 160 can bend, flex, curve, or fold as the first surface 115 of the first platen 105 contacts the first portion 315 of the second layer 160. As shown in FIG. 3, the battery layer stack 199 can include a zig-zag shape, where second layer 160 bends or is folded at numerous points. The second layer 160 can therefore bend, flex, curve, or fold as the first surface 115 of the first platen 105 or the first layer 145 supported by the first surface 115 contacts the first portion 315, where the first portion 315 can be pressed against at least a portion of the first surface 115 or the first layer 145 supported by the first surface 115. For example, if the first platen 105 is angled with respect to the second layer 160 as the first surface 115 contacts the first portion 315, the first portion 315 can bend or flex according to an angle of the first surface 115 such that the first portion 315 can be angled with respect to another portion of the second layer 160. For example, a bend 317 can be formed between the first portion 315 and the second portion 335 of the second layer 160. The bend 317 can be a sharp (e.g., pointed) corner, or can be a rounded (e.g., curved, arcuate, semi-circular) shape. For example, as shown in FIG. 3, among others, the bend 317 can be a corner. The bend 317 can form an angle. For example, the angle can be an acute angle (e.g., 0.5-25 degrees).

The system 100 can include a second platen 125. For example, the second rotator 104 can include the second platen 125. The second platen 125 can rotate in the second direction 130. For example, the second platen 125 can rotate in the second direction 130 as the second rotator 104 rotates in the second direction 130 about the second axis. The second platen 125 can extend radially from the second rotator 104 and can be coupled therewith. For example, the second platen 125 can be fixedly coupled with the second rotator 104 via some coupling method, such as welding, swaging, etc. The second platen 125 can be removably coupled with the second rotator 104 via fasteners or some other coupling method. The second platen 125 can be integrally formed with the second rotator 104 such that the second platen 125 is a permanent member of the second rotator 104.

The system 100 can include the second platen 125 including a second surface 135. For example, the second platen 125 can include a second surface 135 that is flat, curved, stepped, textured, porous, discontinuous, or otherwise configured. The second surface 135 of the second platen 125 can include a curved or lobed surface similar to a gear tooth. The second surface 135 of the second platen 125 can be a flat or generally flat surface comprising a friction-reducing material. For example, the second surface 135 of the second platen 125 can include a smooth surface that can allow an object (e.g., a portion of the second layer 160 or the second separator layer 195) to slide along the second surface 135 with minimal resistance. The second surface 135 can comprise a soft or compliant material that, when contacted by another object (e.g., the first surface 115 of the first platen 105) can temporarily compress or be deformed slightly (e.g., 0.5-5% reduction of a width of the second platen 125). The second surface 135 can comprise a rigid material that does not deform or compress when contacted by another object (e.g., another platen). The second surface 135 can comprise a fluorocarbon material, a silicon material, or another material. The second surface 135 of the second platen can include an impression, groove, raised edge, or other feature that can correspond with a feature of the first surface 115 of the first platen 105.

The system 100 can include the second platen 125 including the second surface 135 that mates with the first surface 115 of the first platen 105. For example, the first surface 115 of the first platen 105 can contact, interact with, interlock, mesh, or approach the second surface 135 of the second platen 125. As the first rotator 102 rotates the first platen 105 in the first direction 110 and as the second rotator 104 rotates the second platen 125 in the second direction, the first platen 105 and the second platen 125 will approach one another between the two rotators 102, 104 as shown in FIG. 1 and in detail in FIG. 2. The first platen 105 of the first rotator 102 and the second platen 125 of the second rotator 104 can periodically and temporarily mesh or mate as the first platen 105 and the second platen 125 rotate, similar to that of teeth of meshing gears, for example. More particularly, the first surface 115 of the first platen 105 can mate, mesh with, contact, interact with, or approach the second surface 135 of the second platen 125 as the first platen 105 and the second platen 125 rotate. For example, at least a portion of the first surface 115 of the first platen 105 and at least a portion of the second surface 135 of the second platen 125 can contact (e.g., touch) as the first platen 105 and the second platen 125 rotate. In some examples, the first platen 105 and the second platen 125 can approach, but not touch each other, as the first platen 105 and the second platen 125 rotate such that a gap or opening exists between the first surface 115 of the first platen 105 and the second surface 135 of the second platen 125 when the first surface 115 mates with the second surface 135.

The system 100 can include the second platen 125 including a second surface 135 that mates with the first surface 115 of the first platen 105 to stack the first layer 145 and the first portion 315 of the second layer 160. For example, the first surface 115 of the first platen 105 can support the first layer 145 and can contact the first portion 315 of the second layer 160. As the first platen 105 rotates, the first surface 115 can support the first layer 145 and can push or pull the first portion 315 of the second layer 160 towards the second surface 135 of the second platen 125. When the first surface 115 of the first platen 105 and the second surface 135 of the second platen 125 mate (e.g., mesh, contact, interact, engage, or align), the first layer 145 and the first portion 315 of the second layer 160 can be stacked together. For example, the first layer 145 can be compressed against the first portion 315 of the second layer 160. In some examples, the first layer 145 can be joined with the first portion 315 of the second battery layer using a joining method. For example, the first layer 145 can be joined with the first portion 315 of the second layer 160 using heat, adhesive (e.g., glue), liquid surface tension, or some combination thereof.

The system 100 can include the first layer 145 and the first portion 315 of the second layer 160 stacked to form a first stack portion 305. For example, the first stack portion 305 can include the first layer 145 joined to the first portion 315 of the second layer 160. The first layer 145 and the first portion 315 of the second layer 160 can be directly joined where there are no other layers in between the first layer 145 and the first portion 315 of the second layer 160. The first layer 145 and the first portion 315 of the second layer 160 can be indirectly joined such that at least one layer separating the first layer 145 and the first portion 315 of the second layer 160. Once the first layer 145 and the first portion 315 of the second layer 160 have been stacked between the mating first surface 115 and the second surface 135, the first layer 145 and the first portion 315 of the second layer 160 can be coupled together in the first stack portion 305 in a stacked orientation. The first stack portion 305 can be pulled or drawn downwards from between the first rotator 102 and the second rotator 104 and collected beneath the first rotator 102 and the second rotator 104. For example, the second layer 160 can be drawn or pulled downwards between the first rotator 102 and the second rotator 104 such that the first stacked portion 305 is pulled downwards. The first stack portion 305 and other stack portions can be collected beneath the first rotator 102 and the second rotator 104.

The system 100 can include the first platen 105 including a raised edge that contacts an edge of the first layer 145. For example, as shown in FIG. 5, the first platen 105 can include a first end 500, a second end 505 and at least one raised edge 510. The first end 500 can be a distal end of the first platen 105 that extends outwards away from a center or hub of the first rotator 102. The second end 505 can be a medial end of the first platen 105 that is proximate to the center or hub of the first rotator 102. The raised edge 510 can be proximate the second end 505 of the first platen 105. The raised edge 510 can comprise a ledge or shelf that extends from the first surface 115 of the first platen 105. For example, the raised edge 510 can protrude from the first surface 115 of the first platen. The raised edge 510 can extend from the first surface 115 of the first platen 105 at a distance that is greater than a thickness of the first layer 145.

The first layer 145 can be placed onto the first surface 115 of the first platen 105 after the first layer 145 is cut from the roll 141 of first material 140. For example, the first layer 145 can be placed on the first surface 115 of the first platen 105 in an orientation where an edge of the first layer 145 is parallel to and proximate to the raised edge 510. The first layer 145 can be placed on the first surface 115 while the first platen 105 is in a substantially horizontal orientation (e.g., ±30° from horizontal). The first layer 145 can be placed on the first surface 115 while the first platen 105 is not in a substantially horizontal orientation such that the first end 500 of the platen 105 oriented greater than 30 degrees from horizontal, for example. As the first platen 105 rotates in the first direction 110, the first platen 105 move towards a substantially vertical orientation (e.g., ±30° from vertical) such that the first end 500 can be elevated above the second end 505. In such an orientation, gravitational force can be applied to the first layer 145 that is positioned on the first surface 115 of the first platen. The gravitation force can cause the first layer 145 to move on the first surface 115 towards the second end 505. The edge of the first layer 145 can contact the raised edge 510. The raised edge 510 can stop the first layer 145 from sliding off of the first surface 115 of the first platen 105. The raised edge 510 can position or orient the first layer 145 on the first surface 115 by controlling the position of the edge of the first layer 145.

The system 100 can include a vacuum system 515 to create a vacuum. For example, the vacuum system 515 can include at least one pump configured to create vacuum pressure via one or more conduits. The conduits can include hoses or other passageways. The vacuum system 515 can be operatively coupled with the first rotator 102 and the second rotator 104 and can be configured to provide vacuum pressure to the first rotator 102 or the second rotator 104. For example, the vacuum system 515 can include a first pump configured to provide vacuum pressure to at least one platen (e.g., the first platen 105) of the first rotator 102, and a second pump configured to provide vacuum pressure to at least one platen (e.g., the second platen 125) of the second rotator 104.

The system 100 can include the first platen 105 defining at least one aperture 520 fluidly coupled with the vacuum system 515. For example, the first platen 105 can define at least one aperture 520 that extends through the first surface 115. The aperture 520 can be fluidly coupled with the vacuum system 515 such that a pump of the vacuum system 515 can apply a vacuum pressure to the first surface 115 of the first platen 105 via the aperture 520. The aperture 520 can extend partially through the first platen 105. For example, the aperture 520 can extend be fluidly coupled with a bore or conduit within the first platen 105. The aperture 520 can extend partially through the first platen 105 from the first surface 115 and can be fluidly coupled with the bore or conduit within the first platen 105. The bore or conduit within the first platen 105 can be fluidly coupled with a pump of the vacuum system 515.

The system 100 can include the at least one aperture 520 to apply the vacuum to a surface of the first layer 145. For example, a pump of the vacuum system 515 can create a vacuum that is applied to the first surface 115 of the first platen 105 via the aperture 520. The first layer 145 can be placed on the first platen 105 and can be positioned at least above the aperture 520. When the pump creates a vacuum, the vacuum pressure can be applied to a surface of the first layer 145 that is positioned on the first surface 115 and at least partially over the aperture 520. The vacuum pressure applied to the first layer 145 can retain or hold the first layer 145 against the first surface 115 of the first platen 105. The first layer 145 can remain against the first surface 115 of the first platen 105 despite gravitational forces can alter a position of the first layer 145 or move the first layer 145 away from the first surface 115 in absence of the applied vacuum.

The system 100 can include the first layer 145 comprising a cathode material and the second layer 160 comprising an anode material. For example, the first layer 145 could be a cathode electrode that includes a battery active material laminated to at least one side of a current collector foil. The first layer 145 can be a cathode layer, as discussed with reference to FIGS. 11-14, among others. The second layer 160 can be an anode electrode that includes a battery active material laminated to at least one side of a current collector foil. The second layer 160 can be an anode layer, as discussed with reference to FIGS. 11-14, among others.

The system 100 can include the second surface 135 of the second platen 125 to mate with the first surface 115 of the first platen 105 to stack the first layer 145, a first portion 310 of a first separator layer 190, and the first portion 315 of the second layer 160. For example, the first separator layer 190 can be provided between the first rotator 102 the second layer 160. As shown in FIGS. 1-3, among others, the first separator layer 190 can be a continuous sheet (e.g., layer, web) provided in between the second layer 160 and the first rotator 102 via a roll 191 of first separator layer 190 material. The first separator layer 190 can be provided between the first rotator 102 and the second rotator 104 as a continuous sheet. The first separator layer 190 can comprise a plurality of portions, including the first portion 310. The first separator layer can include a first side 192 and a second side 194. The first portion 310 of the first separator layer 190 can be a portion of the continuous first separator layer 190 having a length that is approximately equal to or greater than a length or width of the first layer 145 that is positioned on the first surface 115. Because the first separator layer 190 is a continuous layer, the first separator layer 190 can continue beyond the first portion 310. For example, the first separator layer 190 can extend beyond the first portion 310 towards the roll 191 or away from the roll 191.

The first surface 115 of the first platen 105 can contact a first portion 310 of the first separator layer 190. For example, the first surface 115 or the first layer 145 that is supported by the first surface 115 of the first platen 105 can indirectly contact the first portion 310 of the first separator layer 190 where another material is positioned between the first portion 310 of the first separator layer 190 and the first surface 115 or first layer 145. The first surface 115 or the first layer 145 supported by the first surface 115 can directly contact the first portion 310 of the first separator layer 190 in some examples.

The first separator layer 190 can be pliable between the first rotator 102 and the second rotator 104. For example, and because the first separator layer 190 can be a continuous sheet, the first separator layer 190 can be draped or can hang between the first rotator 102 and the second rotator 104 such that the first separator layer 190 can bend, flex, curve, or fold as the first surface 115 of the first platen 105 contacts the first portion 310 of the first separator layer 190. As shown in FIG. 3, the battery layer stack 199 can include a zig-zag shape, where first separator layer 190 and the second layer 160 are bent or folded at numerous points. The first separator layer 190 can therefore bend, flex, curve, or fold as the first surface 115 of the first platen 105 or the first layer 145 supported by the first surface 115 contacts the first portion 310, where the first portion 310 can be pressed against at least a portion of the first surface 115 or the first layer 145 supported by the first surface 115. The first portion 310 may bend or flex according to an angle of the first surface 115 such that the first portion 310 can be angled with respect to another portion of the first separator layer 190.

The first portion 310 of the first separator layer 190 can contact the first portion 315 of the second layer 160. For example, the first surface 115 of the first platen 105 or the first layer 145 supported by the first surface 115 of the first platen 105 can contact the first portion 310 of the first separator layer 190, which can cause the first portion 310 of the first separator layer 190 to contact the first portion 315 of the second layer 160. In such examples, the first portion 310 of the first separator layer 190 can be positioned adjacent to the first portion 315 of the second layer 160.

The first surface 115 of the first platen 105 can mate (e.g., mesh, contact, interact, engage, or align) with the second surface 135 of the second platen 125 to stack the first layer 145, the first portion 310 of the first separator layer 190, and the first portion 310 of the second layer 160. As the first platen 105 rotates, the first surface 115 can support the first layer 145 and can push or pull the first portion 310 of the first separator layer 190 and the first portion 310 of the second layer 160 towards the second surface 135 of the second platen 125. When the first surface 115 of the first platen 105 and the second surface 135 of the second platen 125 mate (e.g., mesh, contact, interact, engage, or align), the first layer 145, the first portion 310 of the first separator layer 190, and the first portion 315 of the second layer 160 can be stacked together. For example, the first layer 145 can be compressed against the first portion 310 of the first separator layer 190, which can be further compressed against the first portion 315 of the second layer 160. In other examples, the first layer 145 can be joined with the first portion 310 of the first separator layer 190 on a first side 192 of the first separator layer 190 using a joining method (e.g., heat, adhesive, liquid surface tension, etc.). The second side 194 of the first portion 310 of the first separator layer 190 can be joined with the first side 162 of the first portion 315 of the second layer 160 using a joining method (e.g., heat, adhesive, liquid surface tension, etc.).

The first stack portion 305 can thus include the first layer 145 joined with the first portion 310 of the first separator layer 190, which is further joined with the first portion 315 of the second layer 160. The first layer 145, the first portion 310 of the first separator layer 190, and the first portion 315 of the second layer 160 can be directly joined where there are no other layers in between the first layer 145 and the first portion 310 of the first separator layer 190 or between the first portion 310 of the first separator layer 190 and the first portion 315 of the second layer 160. The first layer 145, the first portion 310 of the first separator layer 190, and the first portion 315 of the second layer 160 can be indirectly joined such that there is at least one additional layer between the first layer 145 and the first portion 310 of the first separator layer 190 or between the first portion 310 of the first separator layer 190 and the first portion 315 of the second layer 160. Once the first layer 145, the first portion 310 of the first separator layer 190, and the first portion 315 of the second layer 160 have been stacked between the mating first surface 115 and the second surface 135, the first layer 145, the first portion 310 of the first separator layer 190, and the first portion 315 of the second layer 160 can be coupled together in the first stack portion 305 in a stacked orientation.

The system 100 can include the second surface 135 of the second platen 125 to mate with the first surface 115 of the first platen 105 to stack the first layer 145, the first portion 310 of the first separator layer 190, the first portion 315 of the second layer 160, and a first portion 320 of a second separator layer 195. For example, the second separator layer 195 can be provided between the first rotator 102 and the second rotator 104 between to one side of the second layer 160. As shown in FIGS. 1-3, the second separator layer 195 can be a continuous sheet (e.g., layer, web) provided in between the second layer 160 and the second rotator 104 via a roll 196 of second separator layer 195 material. The second separator layer 195 can be provided between the first rotator 102 and the second rotator 104 as a continuous sheet. The second separator layer 195 can comprise a plurality of portions, including the first portion 320. The second separator layer can include a first side 197 and a second side 198. The first portion 320 of the second separator layer 195 can be a portion of the continuous second separator layer 195 having a length that is approximately equal to or greater than a length or width of the first layer 145 that is positioned on the first surface 115. Because the second separator layer 195 is a continuous layer, the second separator layer 195 can continue beyond the first portion 320. For example, the second separator layer 195 can extend beyond the first portion 320 towards the roll 196 or away from the roll 196.

The first surface 115 of the first platen 105 can cause the first portion 315 of the second layer 160 to contact the first portion 320 of the second separator layer 195. For example, the first surface 115 or the first layer 145 that is supported by the first surface 115 of the first platen 105 can contact the first portion 310 of the first separator layer 190 in examples including a first separator layer 190, where the contacted first portion 310 of the first separator layer 190 can further contact the first portion 315 of the second layer 160. The first portion 315 of the second layer 160 can then contact the first portion 320 of the second separator layer 195. In some examples, at least one additional layer of material can be disposed between the second layer 160 and the second separator layer 195 such that the first portion 315 of the second layer 160 indirectly contacts the first portion 320 of the second separator layer.

The second separator layer 195 can be pliable between the first rotator 102 and the second rotator 104. For example, and because the second separator layer 195 is a continuous sheet, the second separator layer 195 can be draped or can hang between the first rotator 102 and the second rotator 104 such that the second separator layer 195 can bend, flex, curve, or fold as the rotating first platen 105 causes the first portion 315 of the second layer 160 to contact the first portion 320 of the second separator layer 195. As shown in FIG. 3, the battery layer stack 199 can include a zig-zag shape, where first separator layer 190, the second layer 160, and the second separator layer 195 are bent or folded at numerous points. The second separator layer 195 can therefore bend, flex, curve, or fold as the first portion 315 of the second layer 160 contacts the first portion 320 of the second separator layer 195. For example, the first portion 320 can be pressed against at least a portion of the first portion 315 of the second layer 160 as the first platen 105 rotates. For example, the first platen 105 can be angled with respect to the second separator layer 195 as the first surface 115 causes the first portion 315 of the second layer 160 to contact the first portion 320. The first portion 320 can bend or flex according to an angle of the first surface 115 such that the first portion 320 can be angled with respect to another portion of the second separator layer 195.

The first portion 315 of the second layer 160 can contact the first portion 320 of the second separator layer 195. For example, the first surface 115 of the first platen 105 or the first layer 145 supported by the first surface 115 of the first platen 105 can contact the first portion 310 of the first separator layer 190, which can cause the first portion 310 of the first separator layer 190 to contact the first portion 315 of the second layer 160, which can further cause the first portion 315 of the second layer 160 to contact the first portion 320 of the second separator layer 195. In such examples, the first portion 320 of the second separator layer 195 can be positioned adjacent to the first portion 315 of the second layer 160.

The first surface 115 of the first platen 105 can mate (e.g., mesh, contact, interact, engage, or align) with the second surface 135 of the second platen 125 to stack the first layer 145, the first portion 310 of the first separator layer 190, the first portion 310 of the second layer 160, and the first portion 320 of the second separator layer 195. As the first platen 105 rotates, the first surface 115 can support the first layer 145 and can push or pull the first portion 310 of the first separator layer 190, the first portion 310 of the second layer 160, and the first portion 320 of the second separator layer 195 towards the second surface 135 of the second platen 125. When the first surface 115 of the first platen 105 and the second surface 135 of the second platen 125 mate (e.g., mesh, contact, interact, engage, or align), the first layer 145, the first portion 310 of the first separator layer 190, the first portion 315 of the second layer 160, and the first portion 320 of the second separator layer 195 can be stacked together. For example, the first layer 145 can be compressed against the first portion 310 of the first separator layer 190, which can be further compressed against the first portion 315 of the second layer 160, which can be further compressed against the first portion 320 of the second separator layer 195, which can be further compressed against the second surface 135 of the second platen 125. In other examples, the first layer 145 can be joined with the first portion 310 of the first separator layer 190 on a first side 192 of the first separator layer 190 using a joining method (e.g., heat, adhesive, liquid surface tension, or other joining method). The second side 194 of the first portion 310 of the first separator layer 190 can be joined with the first side 162 of the first portion 315 of the second layer 160 using a joining method (e.g., heat, adhesive, liquid surface tension, etc.). The second side 164 of the first portion 315 of the second layer 160 can be joined with the first side 197 of the first portion 320 of the second separator layer 195 using a joining method (heat, adhesive, liquid surface tension, or other joining method).

The first stack portion 305 can thus include the first layer 145 joined with the first portion 310 of the first separator layer 190, the first portion 310 of the first separator layer 190 joined with the first portion 315 of the second layer 160, and the first portion 315 of the second layer 160 joined with the first portion 320 of the second separator layer 195. The first layer 145, the first portion 310 of the first separator layer 190, the first portion 315 of the second layer 160, and the first portion 320 of the second separator layer 195 can be directly joined where there are no other layers in between the first layer 145 and the first portion 310 of the first separator layer 190, between the first portion 310 of the first separator layer 190 and the first portion 315 of the second layer 160, or between the first portion 315 of the second layer 160 and the first portion 320 of the second separator layer 195. The first layer 145, the first portion 310 of the first separator layer 190, the first portion 315 of the second layer 160, and the first portion 320 of the second separator layer 195 can be indirectly joined such that there is at least one additional layer between the first layer 145 and the first portion 310 of the first separator layer 190, between the first portion 310 of the first separator layer 190 and the first portion 315 of the second layer 160, or between the first portion 315 of the second layer 160 and the first portion 320 of the second separator layer 195. Once the first layer 145, the first portion 310 of the first separator layer 190, the first portion 315 of the second layer 160, and the first portion 320 of the second separator layer 195 have been stacked between the mating first surface 115 and the second surface 135, the first layer 145, the first portion 310 of the first separator layer 190, the first portion 315 of the second layer 160, and the first portion 320 of the second separator layer 195 can be coupled together in the first stack portion 305 in a stacked orientation.

The system 100 can include a third platen 165 to rotate in the second direction 130. For example, the second rotator 104 can include the third platen 165. The third platen 165 can rotate in the second direction 130 along with the second platen 125. For example, the third platen 165 can rotate in the second direction 130 as the second rotator 104 rotates in the second direction 130 about the second axis. The third platen 165 can extend radially from the second rotator 104 and can be coupled therewith. For example, the third platen 165 can be fixedly coupled with the second rotator 104 via some coupling method, such as welding, swaging, etc. The third platen 165 can be removably coupled with the second rotator 104 via fasteners or some other coupling method. The third platen 165 can be integrally formed with the second rotator 104 such that the third platen 165 is a permanent member of the second rotator 104.

The system 100 can include the third platen 165 including a first surface 170. For example, the third platen 165 can include a first surface 170 that is flat, curved, stepped, textured, porous, discontinuous, or otherwise configured. The first surface 170 of the third platen 165 can include a curved or lobed surface similar to a gear tooth. The first surface 170 of the third platen 165 can be a generally flat surface comprising a friction-reducing material. For example, the first surface 170 of the third platen 165 can include a smooth surface that can allow an object (e.g., a third layer 150) to slide along the first surface 170 with minimal resistance. The first surface 170 of the third platen 170 can comprise a soft or compliant material that, when contacted by another object (e.g., a second surface 120 of the first platen 105) can temporarily compress or be deformed slightly (e.g., 0.5-5% reduction of a width of the third platen 165). The first surface 170 can comprise a fluorocarbon material, a silicon material, or another material. The first surface 170 can comprise a rigid material that does not deform or compress when contacted by another object (e.g., another platen). The first surface 170 of the third platen 165 can include an impression, groove, raised edge, or other feature that can correspond with a feature of the second surface 120 of the first platen 105.

The system 100 can include the first surface 170 of the third platen 165 to support a third layer 150. For example, the third layer 150 can be cut from a roll 141 of first material 140 via the cutting device 144. The third layer 150 can be a singulated layer, such as a singulated cathode electrode layer. For example, the third layer 150 can be a cut, discontinuous, separate, or individual layer that has been cut from a roll of material. The third layer 150 can be similar in size to the first layer 145. The third layer 150 can have dimensions (e.g., a length and width) that are smaller than a length or width of the first surface 170 of the third platen 165. The first surface 170 can include at least one edge, groove, impression, or other feature configured to position the third layer 150 in a particular location on the first surface 170 of the third platen 165. The first surface 170 of the third platen 165 can include a raised edge that can contact or interact with an edge of the third layer 150. An edge of the third layer 150 can rest against the raised edge of the first surface 115 in order to position the first layer 145 in a particular location on the first surface 170. The first surface 170 can support, hold, retain, or carry the third layer 150 on the third platen 165 as the third platen 165 rotates in the second direction 130. For example, the third layer 150 can be held on the first surface 170 of the third platen 165 as the third platen 165 rotates approximately 180 degrees from a first location where the third layer 150 is placed on the first surface 170 (e.g., a position where the first surface 170 is facing upwards) to a second location where the third platen 165 mates with the first platen 105 of the first rotator 102 (e.g., a position where the first surface 170 is facing downwards).

The third platen 165 can include at least one aperture that is fluidly coupled with the vacuum system 515. The aperture can be defined within the first surface 170 of the third platen 165. A pump of the vacuum system 515 can create a vacuum and apply a vacuum pressure via the aperture to the first surface 170. An object (e.g., the third layer 150) positioned on the first surface 170 of the third platen 165 can be held or retained in place by the vacuum pressure, for example.

The system 100 can include the first surface 170 of the third platen 165 to contact a second portion 335 of the second layer 160. For example, the first surface 170 or the third layer 150 that is supported by the first surface 170 of the third platen 165 can indirectly contact the second portion 335 of the second layer 160 where another material (e.g., a second portion 330 of the second separator layer 195) is positioned between the second portion 335 of the second layer 160 and the first surface 170 or third layer 150. The first surface 170 or the third layer 150 supported by the first surface 170 can directly contact the second portion 335 of the second layer 160 in some examples. The second portion 335 of the second layer 160 can be a portion of the continuous second layer 160 having a length that is approximately equal to or greater than a length or width of the third layer 150 that is positioned on the first surface 170. Because the second layer 160 can be a continuous layer, the second layer 160 can continue beyond the second portion 335. For example, the second layer 160 can extend beyond the second portion 335 towards the roll 161 or away from the roll 161 (e.g., to the first portion 315 of the second battery layer). In some examples, the second separator layer 195 can be positioned between the second rotator 104 and the second layer 160 such that the first surface 170 of the third platen 165 contacts a second portion 330 of the second separator layer 195, which further contacts the second portion 335 of the second layer 160. The first separator layer 190 can be positioned between the second layer 160 and the first rotator 102 such that the first surface 170 of the third platen 165 contacts a second portion 330 of the second separator layer 195, which further contacts the second portion 335 of the second layer 160, which further contacts a second portion 340 of the first separator layer 190.

The system 100 can include the first platen 105 including the second surface 120 that mates with the first surface 170 of the third platen 165. For example, the first surface 170 of the third platen 165 can contact, interact with, interlock, mesh, or approach the second surface 120 of the first platen 105. As the second rotator 104 rotates the third platen 165 in the second direction 130 and as the first rotator 102 rotates the first platen 105 in the first direction 110, the third platen 165 and the first platen 105 can approach one another between the two rotators 102, 104. The first platen 105 of the first rotator 102 and the third platen 165 of the second rotator 104 can periodically and temporarily mesh or mate as the first platen 105 and the third platen 165 rotate, similar to that of teeth of meshing gears, for example. More particularly, the first surface 170 of the third platen 165 can mate, mesh with, contact, interact with, or approach the second surface 120 of the first platen 105 as the first platen 105 and the third platen 165 rotate. For example, at least a portion of the first surface 170 of the third platen 165 and at least a portion of the second surface 120 of the first platen 105 can contact (e.g., touch) as the first platen 105 and the third platen 165 rotate. In some examples, the first platen 105 and the third platen 165 can approach, but not touch each other, as the first platen 105 and the third platen 165 rotate such that a gap or opening exists between the first surface 170 of the third platen 165 and the second surface 120 of the first platen 105 when the first surface 170 mates with the second surface 120.

The system 100 can include the second surface 120 of the first platen 105 to mate with the first surface 170 of the third platen 165 to stack the third layer 150 with the second portion 335 of the second layer 160. For example, the first surface 170 of the third platen 165 can support the third layer 150 and can contact the second portion 335 of the second layer 160. As the third platen 165 rotates in the second direction 130, the first surface 170 can support the third layer 150 and can push or pull the second portion 335 of the second layer 160 towards the second surface 120 of the first platen 105. When the first surface 170 of the third platen 165 and the second surface 120 of the first platen 105 mate (e.g., mesh, contact, interact, engage, or align), the third layer 150 and the second portion 335 of the second layer 160 can be stacked together. For example, the third layer 150 can be compressed against the second portion 335 of the second layer 160. In other examples, the third layer 150 can be joined with the second portion 335 of the second layer 160 using a joining method. For example, the third layer 150 can be joined with the second portion 335 of the second layer 160 using heat, adhesive (e.g., glue), liquid surface tension, or some combination thereof. The third layer 150 can be indirectly joined with the second portion 335 of the second layer 160. For example, another layer (e.g., the second portion 330 of the second separator layer 195 can be disposed between the third layer 150 and the second portion 335 of the second layer 160.

The system 100 can include the second portion 335 of the second layer 160 continuous with the first portion 310 of the second layer 160. As noted above, the second layer 160 can be provided between the first rotator 102 and the second rotator 104 in continuous form (e.g., as a continuous sheet, layer, web, etc.) The first portion 310 of the second layer 160 can be connected with or continuous with the second portion 335 of the second layer 160. For example, the second layer 160 can be uncut (e.g., constant) between the first portion 310 and the second portion 335. While first layer 145 and the third layer 150 can be cut from the roll 141 of first material 140 such that the first layer 145 is discontinuous or disconnected from the third layer 150, the first portion 310 and the second portion 335 can be separate portions of a single length of the second layer 160.

The system 100 can include the third layer 150 and the second portion 335 of the second layer 160 stacked to form a second stack portion 325. For example, the second stack portion 325 can include the third layer 150 joined to the second portion 335 of the second layer 160. The third layer 150 and the second portion 335 of the second layer 160 can be directly joined where there are no other layers in between the third layer 150 and the second portion 335 of the second layer 160. The third layer 150 and the second portion 335 of the second layer 160 can be indirectly joined such that at least one layer separating the third layer 150 and the second portion 335 of the second layer 160. Once the third layer 150 and the second portion 335 of the second layer 160 have been stacked between the mating first surface 170 of the third platen 165 and the second surface 120 of the first platen 105, the third layer 150 and the second portion 335 of the second layer 160 can be coupled together in the second stack portion 325 in a stacked orientation. The second stack portion 325 can be pulled or drawn downwards from between the first rotator 102 and the second rotator 104 and collected beneath the first rotator 102 and the second rotator 104. For example, the second layer 160 can be drawn or pulled downwards between the first rotator 102 and the second rotator 104 such that the second stack portion 325 is pulled downwards. The second stack portion 325 and other stack portions (e.g., the first stack portion 305) can be collected beneath the first rotator 102 and the second rotator 104.

The system 100 can include the second surface 120 of the first platen 105 to mate with the first surface 170 of the third platen 165 to stack the third layer 150, the second portion 330 of the second separator layer 195, the second portion 335 of the second layer 160, and a second portion 340 of the first separator layer 190. For example, the second separator layer 195 can be provided between the second rotator 104 and the second layer 160. The first separator layer 190 can be provided between the first rotator 102 and the second layer 160. The second portion 330 of the second separator layer 195 can be a portion of the continuous second separator layer 195 having a length that is approximately equal to or greater than a length or width of the third layer 150 that is positioned on the first surface 170 of the third platen 165.

The second portion 340 of the first separator layer 190 can be a portion of the continuous first separator layer 190 having a length that is approximately equal to or greater than a length or width of the third layer 150 that is positioned on the first surface 170 of the third platen 165. Because the second separator layer 195 can be a continuous layer, the second separator layer 195 can continue beyond the second portion 330. For example, the second portion 330 of the second separator layer 195 can be connected with or continuous with the first portion 320 of the second separator layer 195. Because the first separator layer 190 can be a continuous layer, the first separator layer 190 can continue beyond the second portion 340. For example, the second portion 340 of the first separator layer 190 can be connected with or continuous with the first portion 310 of the first separator layer 190.

The first surface 170 of the third platen 165 can contact the second portion 330 of the second separator layer 195. For example, the first surface 170 or the third layer 150 that is supported by the first surface 170 of the third platen 165 can indirectly contact the second portion 330 of the second separator layer 195 where another material is positioned between the second portion 330 of the second separator layer 195 and the first surface 170 or third layer 150. The first surface 170 or the third layer 150 supported by the first surface 170 can directly contact the second portion 330 of the second separator layer 195 in some examples.

The second separator layer 195 can bend, flex, curve, or fold as the first surface 170 of the third platen 165 or the third layer 150 supported by the first surface 170 contacts the second portion 330. For example, the second portion 330 can be pressed against at least a portion of the first surface 170 or the third layer 150 supported by the first surface 170. The second portion 330 may bend or flex according to an angle of the first surface 170 such that the second portion 330 can be angled with respect to another portion (e.g., the first portion 320) of the second separator layer 195. For example, a bend 322 can be formed between the first portion 320 and the second portion 330 of the second separator layer 195. The bend 322 can be a sharp (e.g., pointed) corner, or can be a rounded (e.g., curved, arcuate, semi-circular) shape. For example, as shown in FIG. 3, among others, the bend 322 can be a corner. The bend 322 can form an angle. For example, the angle can be an acute angle (e.g., 0.5-25 degrees).

The second portion 330 of the second separator layer 195 can contact the second portion 335 of the second layer 160. For example, the first surface 170 of the third platen 165 or the third layer 150 supported by the first surface 170 of the third platen 165 can contact the second portion 330 of the second separator layer 195, which can cause the second portion 330 of the second separator layer 195 to contact the second portion 335 of the second layer 160. In such examples, the second portion 330 of the second separator layer 195 can be positioned adjacent to the second portion 335 of the second layer 160.

The first surface 170 of the third platen 165 can cause the second portion 335 of the second layer 160 to contact the second portion 340 of the first separator layer 190. For example, the first surface 170 or the third layer 150 that is supported by the first surface 170 of the third platen 165 can contact the second portion 330 of the second separator layer 195. The contacted second portion 330 of the second separator layer 195 can further contact the second portion 335 of the second layer 160. The second portion 335 of the second layer 160 can then contact the second portion 340 of the first separator layer 190. In some examples, at least one additional layer of material can be disposed between the second layer 160 and the first separator layer 190 such that the second portion 335 of the second layer 160 indirectly contacts the second portion 340 of the first separator layer 190.

The first separator layer 190 can bend, flex, curve, or fold as the second portion 335 of the second layer 160 contacts the second portion 340 of the first separator layer 190. For example, the second portion 340 can be pressed against at least a portion of the second portion 335 of the second layer 160 as the third platen 165 rotates in the second direction 130. The second portion 340 may bend or flex according to an angle of the first surface 170 such that the second portion 340 can be angled with respect to another portion of the first separator layer 190. For example, a bend 312 can be formed between the first portion 310 and the second portion 340 of the first separator layer 190. The bend 312 can be a sharp (e.g., pointed) corner, or can be a rounded (e.g., curved, arcuate, semi-circular) shape. For example, as shown in FIG. 3, among others, the bend 312 can be a corner. The bend 312 can form an angle. For example, the angle can be an acute angle (e.g., 0.5-25 degrees).

As the third platen 165 rotates, the first surface 170 can support the third layer 150 and can push or pull the second portion 330 of the second separator layer 195, the second portion 335 of the second layer 160, and the second portion 340 of the first separator layer 190 towards the second surface 120 of the first platen 105. When the first surface 170 of the third platen 165 and the second surface 120 of the first platen 105 mate (e.g., mesh, contact, interact, engage, or align), the third layer 150, the second portion 330 of the second separator layer 195, the second portion 335 of the second layer 160, and the second portion 340 of the first separator layer 190 can be stacked together. For example, the third layer 150 can be compressed against the second portion 330 of the second separator layer 195, which can be further compressed against the second portion 335 of the second layer 160, which can be further compressed against the second portion 340 of the first separator layer 190, which can be further compressed against the second surface 120 of the first platen 105. In other examples, the third layer 150 can be joined with the second portion 330 of the second separator layer 195 on a second side 198 of the second separator layer 195 using a joining method (e.g., heat, adhesive, liquid surface tension, etc.). The first side 197 of the second portion 330 of the second separator layer 195 can be joined with the second side 164 of the second portion 335 of the second layer 160 using a joining method (e.g., heat, adhesive, liquid surface tension, etc.). The first side 162 of the second portion 335 of the second layer 160 can be joined with the second side 194 of the second portion 340 of the first separator layer 190 using a joining method (heat, adhesive, liquid surface tension, etc.).

The second stack portion 325 can thus include the third layer 150 joined with the second portion 330 of the second separator layer 195, the second portion 330 of the second separator layer 195 joined with the second portion 335 of the second layer 160, and the second portion 335 of the second layer 160 joined with the second portion 340 of the first separator layer 190. The third layer 150, the second portion 330 of the second separator layer 195, the second portion 335 of the second layer 160, and the second portion 340 of the first separator layer 190 can be directly joined where there are no other layers in between the third layer 150 and the second portion 330 of the second separator layer 195, between the second portion 330 of the second separator layer 195 and the second portion 335 of the second layer 160, or between the second portion 335 of the second layer 160 and the second portion 340 of the first separator layer 190. The third layer 150, the second portion 330 of the second separator layer 195, the second portion 335 of the second layer 160, and the second portion 340 of the first separator layer 190 can be indirectly joined such that there is at least one additional layer between the third layer 150 and the second portion 330 of the second separator layer 195, between the second portion 330 of the second separator layer 195 and the second portion 335 of the second layer 160, or between the second portion 335 of the second layer 160 and the second portion 340 of the first separator layer 190. Once the third layer 150, the second portion 330 of the second separator layer 195, the second portion 335 of the second layer 160, and the second portion 340 of the first separator layer 190 have been stacked between the mating first surface 170 and the second surface 120, the third layer 150, the second portion 330 of the second separator layer 195, the second portion 335 of the second layer 160, and the second portion 340 of the first separator layer 190 can be coupled together in the second stack portion 325 in a stacked orientation.

The system 100 can include a fourth platen 180 to rotate in the first direction 110. For example, the first rotator 102 can include the fourth platen 180. The fourth platen 180 can rotate in the first direction 110. For example, the fourth platen 180 can rotate in the first direction 110 as the first rotator 102 rotates in the first direction 110 about the first axis. The fourth platen 180 can extend radially from the first rotator 102 and can be coupled therewith. For example, the fourth platen 180 can be fixedly coupled with the first rotator 102 via some coupling method, such as welding, swaging, etc. The fourth platen 180 can be removably coupled with the first rotator 102 via fasteners or some other coupling method. The fourth platen 180 can be integrally formed with the first rotator 102 such that the fourth platen 180 is a permanent member of the first rotator 102.

The system 100 can include the fourth platen 180 including a first surface 182. For example, the fourth platen 180 can include a first surface 182 that is flat, curved, stepped, textured, porous, discontinuous, or otherwise configured. The first surface 182 of the fourth platen 180 can include a curved or lobed surface similar to a gear tooth. The first surface 182 of the fourth platen 180 can be a generally flat surface comprising a friction-reducing material. For example, the first surface 182 can include a smooth surface that can allow an object (e.g., a battery electrode or layer of first material 140) to slide along the first surface 182 with minimal resistance, particularly under a gravitational force. The first surface 182 can comprise a soft or compliant material that, when contacted by another object (e.g., another platen) can temporarily compress or be deformed slightly (e.g., 0.5-5% reduction of a width of the fourth platen 180). The first surface 182 can comprise a fluorocarbon material, a silicon material, or another material. The first surface 182 can comprise a rigid material that does not deform or compress when contacted by another object (e.g., another platen).

The system 100 can include the first surface 182 of the fourth platen 180 to support a fourth layer 155. For example, the fourth layer 155 can be cut from a roll 141 of first material 140 via the cutting device 144. The fourth layer 155 can be a singulated layer, such as a singulated cathode electrode layer. For example, the fourth layer 155 can be a cut, discontinuous, separate, or individual layer that has been cut from a roll of material. The fourth layer 155 can have dimensions (e.g., a length and width) that are smaller than a length or width of the first surface 182 of the fourth platen 180. The first surface 182 can include at least one edge, groove, impression, or other feature configured to position the fourth layer 155 in a particular location on the first surface 182 of the fourth platen 180. For example, and similar to that shown in FIG. 5, the first surface 182 can include a raised edge that can contact or interact with an edge of the fourth layer 155. An edge of the fourth layer 155 can rest against the raised edge of the first surface 182 in order to position the fourth layer 155 in a particular location on the first surface 182. The first surface 182 can support, hold, retain, or carry the fourth layer 155 on the fourth platen 180 as the fourth platen 180 rotates in the first direction 110. For example, the fourth layer 155 can be held on the first surface 182 of the fourth platen 180 as the fourth platen 180 rotates approximately 180 degrees from a first location where the fourth layer 155 is placed on the first surface 182 to a second location where the fourth platen 180 mates with a platen of the second rotator 104 (e.g., the third platen 165).

Figure 14:
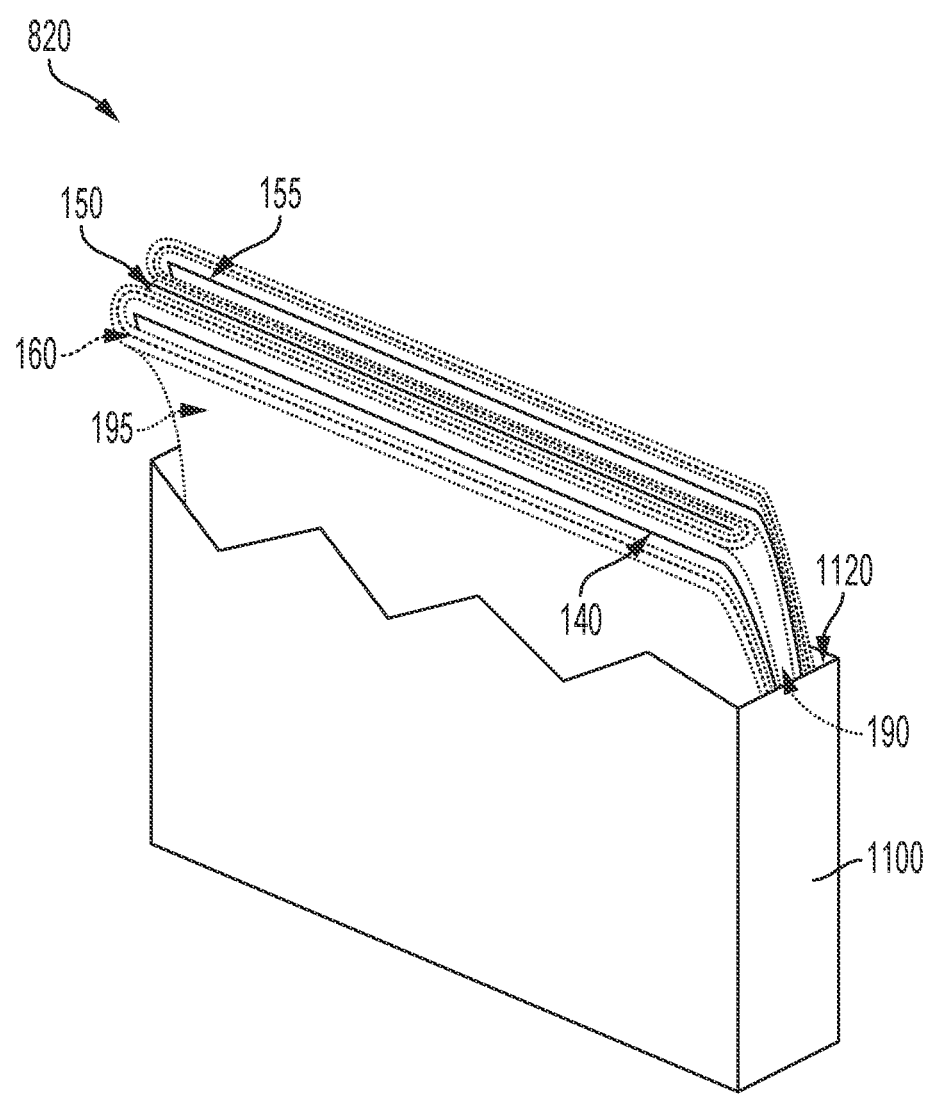
FIG. 14 depicts an example cross-sectional view of a battery cell, in accordance with some aspects.
Figure 14A:
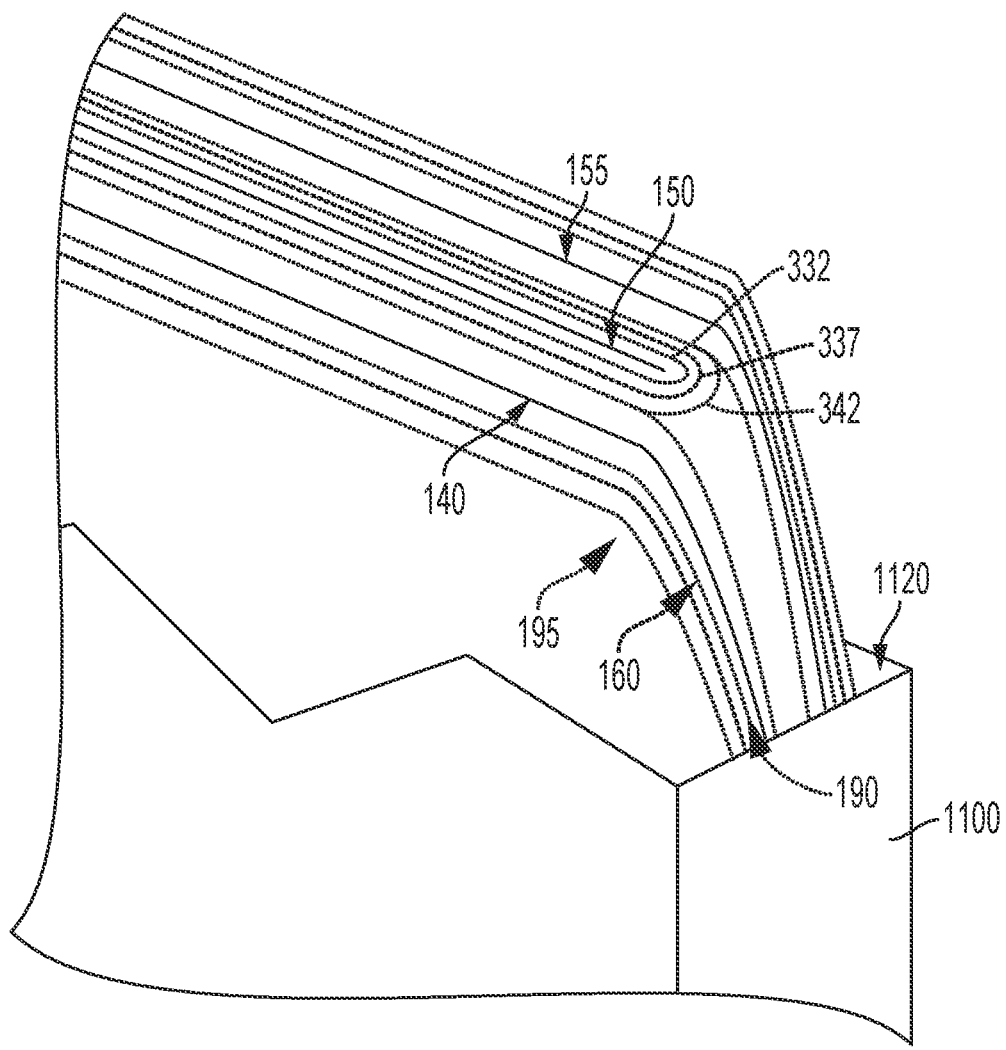
FIG. 14A depicts a detail view of the cross-sectional view of the battery cell of FIG. 14, in accordance with some aspects.

The system 100 can include the first surface 182 of the fourth platen 180 to contact a third portion 355 of the second layer 160. For example, the first surface 182 or the fourth layer 155 that is supported by the first surface 182 of the fourth platen 180 can indirectly contact the third portion 355 of the second layer 160 where another material (e.g., a third portion 350 of the first separator layer 190) is positioned between the third portion 355 of the second layer 160 and the first surface 182 or fourth layer 155. The first surface 182 or the fourth layer 155 supported by the first surface 182 can directly contact the third portion 355 of the second layer 160 in some examples. The second portion 355 of the second layer 160 can be a portion of the continuous second layer 160 having a length that is approximately equal to or greater than a length or width of the fourth layer 155 that is positioned on the first surface 182. Because the second layer 160 can be a continuous layer, the second layer 160 can continue beyond the third portion 355. For example, the second layer 160 can extend beyond the third portion 355 towards the roll 161 or away from the roll 161 (e.g., to the second portion 335 of the second battery layer). In some examples, the first separator layer 190 can be positioned between the first rotator 102 and the second layer 160 such that the first surface 182 of the fourth platen 180 contacts a third portion 350 of the first separator layer 190, which further contacts the third portion 355 of the second layer 160. The second separator layer 195 can be positioned between the second layer 160 and the second rotator 104 such that the first surface 182 of the fourth platen 180 contacts a third portion 350 of the first separator layer 190, which further contacts the third portion 355 of the second layer 160, which further contacts a third portion 360 of the second separator layer 195. A bend 337 can be formed between the second portion 335 and the third portion 355 of the second layer 160. The bend 337 can be a sharp (e.g., pointed) corner, or can be a rounded (e.g., curved, arcuate, semi-circular) shape. For example, as shown in FIG. 3, among others, the bend 337 can be a corner. As shown in FIG. 14A, among others, the bend 337 can be rounded, for example. The bend 337 can form an angle. For example, the angle can be an acute angle (e.g., 0.5-25 degrees).

The system 100 can include the third platen 165 including a second surface 175 that mates with the first surface 182 of the fourth platen 180. For example, the first surface 182 of the fourth platen 180 can contact, interact with, interlock, mesh, or approach the second surface 175 of the third platen 165. As the second rotator 104 rotates the third platen 165 in the second direction 130 and as the first rotator 102 rotates the fourth platen 180 in the first direction 110, the third platen 165 and the fourth platen 180 can approach one another between the two rotators 102, 104. The fourth platen 180 of the first rotator 102 and the third platen 165 of the second rotator 104 can periodically and temporarily mesh or mate as the fourth platen 180 and the third platen 165 rotate, similar to that of teeth of meshing gears, for example. More particularly, the first surface 182 of the fourth platen 180 can mate, mesh with, contact, interact with, or approach the second surface 175 of the third platen 165 as the fourth platen 180 and the third platen 165 rotate. For example, at least a portion of the first surface 182 of the fourth platen 180 and at least a portion of the second surface 175 of the third platen 165 can contact (e.g., touch) as the fourth platen 180 and the third platen 165 rotate. In some examples, the fourth platen 180 and the third platen 165 can approach, but not touch each other, as the fourth platen 180 and the third platen 165 rotate such that a gap or opening exists between the first surface 182 of the fourth platen 180 and the second surface 175 of the third platen 165 when the first surface 182 mates with the second surface 175.

The system 100 can include the first surface 182 of the fourth platen 180 to mate with the second surface 175 of the third platen 165 to stack the fourth layer 155, the third portion 350 of the first separator layer 190, the third portion 355 of the second layer 160, and a third portion 360 of the second separator layer 195 to form a third stack portion 345. For example, the first separator layer 190 can be provided between the first rotator 102 and the second layer 160. The second separator layer 195 can be provided between the second rotator 104 and the second layer 160. The third portion 350 of the first separator layer 190 can be a portion of the continuous first separator layer 190 having a length that is approximately equal to or greater than a length or width of the fourth layer 155 that is positioned on the first surface 182 of the fourth platen 180. The third portion 360 of the second separator layer 195 can be a portion of the continuous second separator layer 195 having a length that is approximately equal to or greater than a length or width of the fourth layer 155 that is positioned on the first surface 182 of the fourth platen 180. Because the second separator layer 195 can be a continuous layer, the second separator layer 195 can continue beyond the third portion 360. For example, the third portion 360 of the second separator layer 195 can be connected with or continuous with the second portion 330 of the second separator layer 195. For example, a bend 332 can be formed between the second portion 330 and the third portion 360 of the second separator layer 195. The bend 332 can be a sharp (e.g., pointed) corner, or can be a rounded (e.g., curved, arcuate, semi-circular) shape. For example, as shown in FIG. 3, among others, the bend 332 can be a corner. As shown in FIG. 14A, among others, the bend 332 can be rounded, for example. The bend 332 can form an angle. For example, the angle can be an acute angle (e.g., 0.5-25 degrees). Because the first separator layer 190 can be a continuous layer, the first separator layer 190 can continue beyond the third portion 350. For example, the third portion 350 of the first separator layer 190 can be connected with or continuous with the second portion 340 of the first separator layer 190. For example, a bend 342 can be formed between the second portion 340 and the third portion 350 of the first separator layer 190. The bend 342 can be a sharp (e.g., pointed) corner, or can be a rounded (e.g., curved, arcuate, semi-circular) shape. For example, as shown in FIG. 3, among others, the bend 342 can be a corner. As shown in FIG. 14A, among others, the bend 342 can be rounded, for example. The bend 342 can form an angle. For example, the angle can be an acute angle (e.g., 0.5-25 degrees).

The third stack portion 345 can include the fourth layer 155 joined with the third portion 350 of the first separator layer 190, the third portion 350 of the first separator layer 190 joined with the third portion 355 of the second layer 160, and the third portion 355 of the second layer 160 joined with the third portion 360 of the second separator layer 195. The fourth layer 155, the third portion 350 of the first separator layer 190, the third portion 355 of the second layer 160, and the third portion 360 of the second separator layer 195 can be directly joined where there are no other layers in between the fourth layer 155 and the third portion 350 of the first separator layer 190, between the third portion 350 of the first separator layer 190 and the third portion 355 of the second layer 160, or between the third portion 355 of the second layer 160 and the third portion 360 of the second separator layer 195. The fourth layer 155, the third portion 350 of the first separator layer 190, the third portion 355 of the second layer 160, and the third portion 360 of the second separator layer 195 can be indirectly joined such that there is at least one additional layer between the fourth layer 155 and the third portion 350 of the first separator layer 190, between the third portion 350 of the first separator layer 190 and the third portion 355 of the second layer 160, or between the third portion 355 of the second layer 160 and the third portion 360 of the second separator layer 195. Once the fourth layer 155, the third portion 350 of the first separator layer 190, the third portion 355 of the second layer 160, and the third portion 360 of the second separator layer 195 have been stacked between the mating first surface 182 and the second surface 175, the fourth layer 155, the third portion 350 of the first separator layer 190, the third portion 355 of the second layer 160, and the third portion 360 of the second separator layer 195 can be coupled together in the third stack portion 345 in a stacked orientation.

The system 100 can include a fifth platen 185 to rotate in the second direction 130. For example, the second rotator 104 can include the fifth platen 185. The fifth platen 185 can rotate in the second direction 130. For example, the fifth platen 185 can rotate in the second direction 130 as the second rotator 104 rotates in the second direction 130 about the second axis. The fifth platen 185 can extend radially from the second rotator 104 and can be coupled therewith. For example, the fifth platen 185 can be fixedly coupled with the second rotator 104 via some coupling method, such as welding, swaging, etc. The fifth platen 185 can be removably coupled with the second rotator 104 via fasteners or some other coupling method. The fifth platen 185 can be integrally formed with the second rotator 104 such that the fifth platen 185 is a permanent member of the second rotator 104.

The system 100 can include the fifth platen 185 including a first surface 187. For example, the fifth platen 185 can include a first surface 187 that is flat, curved, stepped, textured, porous, discontinuous, or otherwise configured. The first surface 187 of the fifth platen 185 can include a curved or lobed surface similar to a gear tooth. The first surface 187 of the fifth platen 185 can be a generally flat surface comprising a friction-reducing material. For example, the first surface 187 can include a smooth surface that can allow an object (e.g., a battery electrode or layer of first material 140) to slide along the first surface 187 with minimal resistance, particularly under a gravitational force. The first surface 187 can comprise a soft or compliant material that, when contacted by another object (e.g., another platen) can temporarily compress or be deformed slightly (e.g., 0.5-5% reduction of a width of the fifth platen 185). The first surface 187 can comprise a fluorocarbon material, a silicon material, or another material. The first surface 187 can comprise a rigid material that does not deform or compress when contacted by another object (e.g., another platen).

The system 100 can include the first surface 187 of the fifth platen 185 to support a fifth layer 157. For example, the fifth layer 157 can be cut from a roll 141 of first material 140 via the cutting device 144. The fifth layer 157 can be a singulated layer, such as a singulated cathode electrode layer. For example, the fifth layer 157 can be a cut, discontinuous, separate, or individual layer that has been cut from a roll of material. The fifth layer 157 can have dimensions (e.g., a length and width) that are smaller than a length or width of the first surface 187 of the fifth platen 185. The first surface 187 can include at least one edge, groove, impression, or other feature configured to position the fifth layer 157 in a particular location on the first surface 187 of the fifth platen 185. For example, and similar to that shown in FIG. 5, the first surface 187 can include a raised edge that can contact or interact with an edge of the fifth battery layer 157. An edge of the fourth layer 155 can rest against the raised edge of the first surface 187 in order to position the fifth layer 157 in a particular location on the first surface 187. The first surface 187 can support, hold, retain, or carry the fifth layer 157 on the fifth platen 185 as the fifth platen 185 rotates in the second direction 130. For example, the fifth layer 157 can be held on the first surface 187 of the fifth platen 185 as the fifth platen 185 rotates approximately 180 degrees from a first location where the fifth layer 157 is placed on the first surface 187 to a second location where the fifth platen 185 mates with a platen of the first rotator 102 (e.g., the fourth platen 180).

As depicted in FIG. 3, among others, the system 100 can include the first surface 187 of the fifth platen 185 to mate with a second surface of the fourth platen 180 to stack the fifth layer 157, a fourth portion 370 of the second separator layer 195, a fourth portion 375 of the second layer 160, and a fourth portion 380 of the first separator layer 190 to form a fourth stack portion 365.

Figure 4:
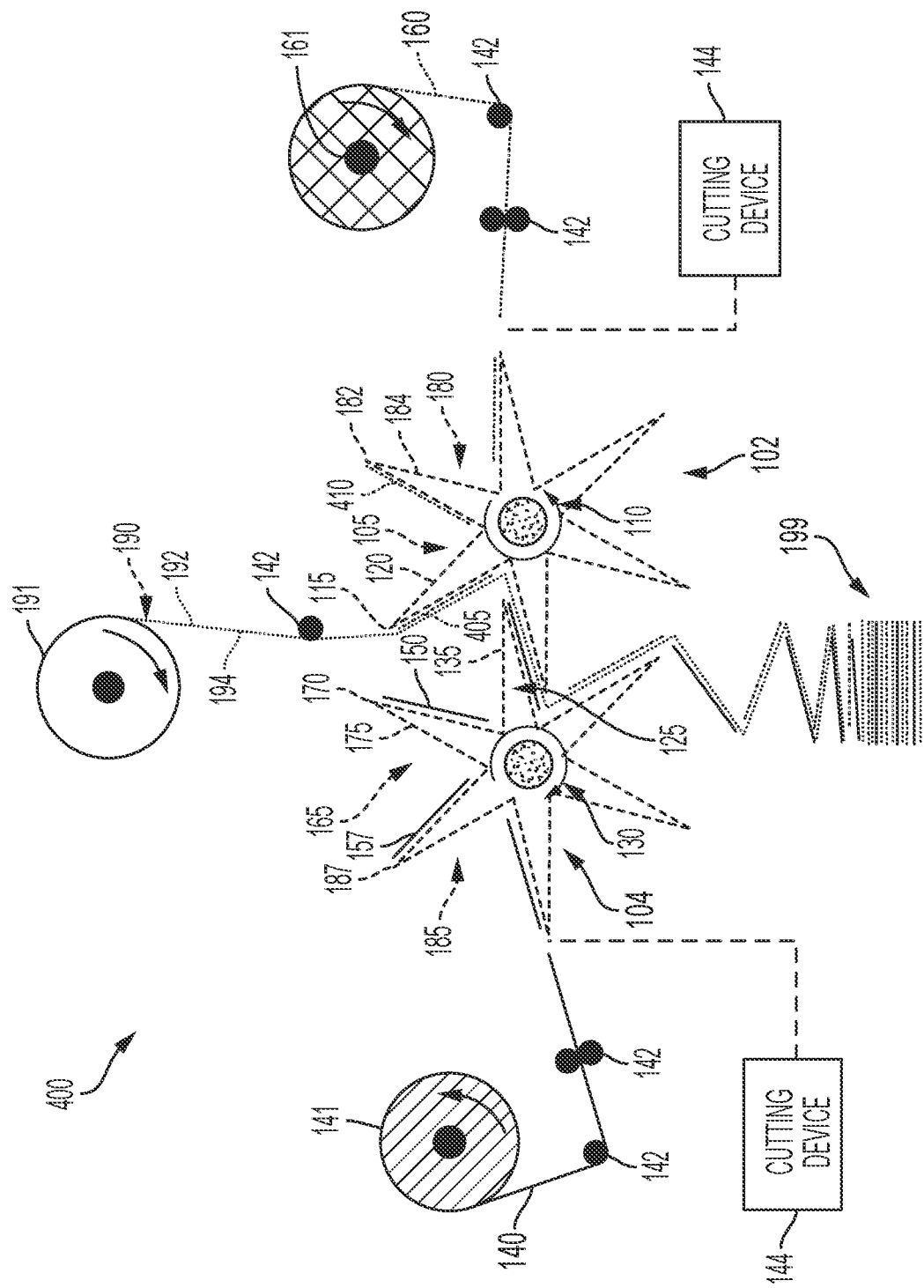
FIG. 4 depicts an example system for manufacturing a battery cell, in accordance with some aspects.

FIG. 4 depicts the system 100 for manufacturing a battery cell. The system 100 can include the first rotator 102, the second rotator 104, where each rotator can include at least one rotating platen. For example, the first rotator 102 can include the first platen 105 and the fourth platen 180 and can rotate in the first direction 110. The second rotator 104 can include the second platen 125 and the third platen 165 and can rotate in the second direction 130. The first separator layer 190 can be received between the first rotator 102 and the second rotator 104. The platens of the first rotator 102 can mate (e.g., mesh, contact, interact, engage, or align) the platens of the second rotator 104. The first material 140 can be provided to the platens of the second rotator 104. For example, a sheet or layer of first material 140 can be cut from a roll 141 of first material 140 by the cutting device 144 as a the sheet or layer is provided to a platen of the second rotator 104.

The second layer 160 can be provided to the platens of the first rotator 102. For example, a singulated (e.g., cut, discontinuous, separate, or individual) sheet or layer of second layer 160 can be cut to a particular size or dimension from the roll 161 by the cutting device 144 as a sheet or layer is provided to a platen of the first rotator 102. The second layer 160 can be cut into a layer or sheet having particular dimensions, rather than as a continuous sheet as depicted in FIGS. 1-3, among others. The second layer 160 can be provided to the cutting device 144 of the system 100 from at least one roll 161. The cutting device 144 can cut a sheet (e.g., layer, web, singulated layer, separate layer, or portion) from the roll 161 prior to or as the second layer 160 is provided to the system 100. For example, the cutting device 144 can cut at least one battery layer from the second layer 160 from the roll 161. Each of the battery layers cut from the second layer 160 can be provided to one of the first rotator 102 cut form via the feeder device 142 (e.g., web handling device, roller, or other element).

The first surface 115 of the first platen 105 can support a first layer 405, such as a first singulated electrode layer. For example, the first layer 405 can be a cut, discontinuous, separate, or individual layer that has been cut from a roll of material. The first layer 405 can be or include a first battery layer. The first layer 405 can be or include an anode electrode. The first layer 405 can be cut from the second layer 160 and provided to the first rotator 102. The first surface 115 of the first platen 105 or the first layer 405 supported by the first surface 115 can contact the first portion 310 of the first separator layer 190 as the first platen 105 rotates in the first direction 110. The first surface 115 of the first platen 105 can mate with (e.g., contact, interact with, mesh with) the second surface 135 of the second platen 125 to stack the first layer 405 with the first portion 310 of the first separator layer 190. In examples where the second layer 160 is not provided between the rotators 102, 104, but is instead cut and provided to the first rotator 102, a first stack portion can comprise the first layer 405 and the first portion 310 of the first separator layer 190, but not a another battery layer (e.g., a cathode layer or an anode layer) or another separator layer.

The first surface 170 of the third platen 165 can support the third layer 150. The third layer 150 can be cut or singulated from the first material 140 and provided to the second rotator 104. The first surface 170 of the third platen 165 or the third layer 150 supported by the first surface 170 can contact the second portion 340 of the first separator layer 190 as the third platen 165 rotates in the second direction 130. The first surface 170 of the third platen 165 can mate with (e.g., contact, interact with, mesh with) the second surface 120 of the first platen 105 to stack the third layer 150 with the second portion 340 of the first separator layer 190. In examples where the second layer 160 is not provided between the rotators 102, 104, but is instead cut and provided to the first rotator 102, a second stack portion can include the third layer 150 and the second portion 340 of the first separator layer 190, but not another battery layer (e.g., an anode layer or a cathode layer) or another separator layer.

The first stack portion including the first layer 405 and the first portion 310 of the first separator layer 190 can be combined with and the second stack portion including the third layer 150 and the second portion 340 of the first separator layer 190 to create a first battery portion. The first battery portion can include the first layer 405 that can be cut from the second layer 160 and the third layer 150 that can be cut from the first material 140. The first layer 405 and the third layer 150 can be separated by the second portion 340 of the first separator layer 190, for example. For example, the first battery portion can include an anode battery layer (e.g., the first layer 405) and a cathode battery layer (e.g., the third layer 150), where the anode battery layer and the cathode battery layer are stacked with a separator layer between different mating platens.

The first surface 182 of the fourth platen 180 can support a fourth layer 410. The fourth layer 410 can be a singulated layer, such as a singulated anode electrode layer. For example, the fourth layer 410 can be a cut, discontinuous, separate, or individual layer that has been cut from a roll of material. The fourth layer 410 can be a fourth battery layer. The fourth layer 410 can be cut from the second layer 160 and provided to the first rotator 102. The first surface 182 of the fourth platen 180 or the fourth layer 410 supported by the first surface 182 can contact the third portion 350 of the first separator layer 190 as the fourth platen 180 rotates in the first direction 110. The first surface 182 of the fourth platen 180 can mate with (e.g., contact, interact with, mesh with) the second surface 175 of the third platen 165 to stack the fourth layer 410 with the third portion 350 of the first separator layer 190. In examples where the second layer 160 is not provided between the rotators 102, 104, but is instead cut and provided to the first rotator 102, a third stack portion can comprise the fourth layer 410 and the third portion 350 of the first separator layer 190, but not a another battery layer (e.g., a cathode layer or an anode layer) or another separator layer.

The first surface 187 of the fifth platen 185 can support the fifth layer 157. The fifth layer 157 can be cut from the first material 140 and provided to the second rotator 104. The first surface 187 of the fifth platen 185 or the fifth layer 157 supported by the first surface 187 can contact a fourth portion 380 of the first separator layer 190 as the fifth platen 185 rotates in the second direction 130. The first surface 187 of the fifth platen 185 can mate with (e.g., contact, interact with, mesh with) the second surface 184 of the fourth platen 180 to stack the fifth layer 157 with the fourth portion 380 of the first separator layer 190. In examples where the second layer 160 is not provided between the rotators 102, 104, but is instead cut and provided to the first rotator 102, a fourth stack portion can comprise the fifth layer 157 and the fourth portion 380 of the first separator layer 190, but not another battery layer (e.g., an anode layer or a cathode layer) or another separator layer.

The third stack portion including the fourth layer 410 and the third portion 350 of the first separator layer 190 can be combined with and the second stack portion including the fifth layer 157 and the fourth portion 380 of the first separator layer 190 to create a second battery portion. The second battery portion can include the fourth layer 410 that can be cut from the second layer 160 and the fifth layer 157 that can be cut from the first material 140. The fourth layer 410 and the fifth layer 157 can be separated by the fourth portion 380 of the first separator layer 190, for example. For example, the first battery portion can include an anode battery layer (e.g., the fourth layer 410) and a cathode battery layer (e.g., the fifth layer 157), where the anode battery layer and the cathode battery layer are stacked with a separator layer between different mating platens.

Figure 6:
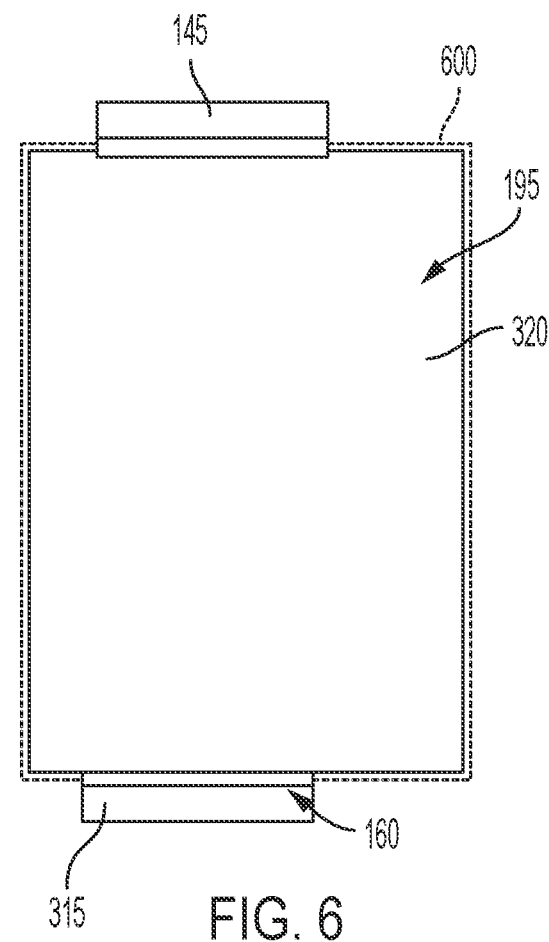
FIG. 6 depicts example layers for a battery cell, in accordance with some aspects.

FIG. 6 depicts an example battery layer stack 199. The system 100 can include the battery layer stack 199 with heat sealed areas. For example, the battery layer stack 199 can include a first stack portion 305, the second stack portion 325, or other stack portion that are sealed within a pouch. The pouch 600 can comprise an insulating material, such as a material used to create the first separator layer 190 or the second separator layer 195. For example, the pouch 600 can comprise at least one of the first separator layer 190 or the second separator layer 195. The first separator layer 190 or the second separator layer 195 of the pouch 600 can be solid electrolyte layers (e.g., solid-state electrolyte layers). For example, the first separator layer 190 and the second separator layer 195 can be or include a solid electrolyte material that can conduct ions without the addition of a separate liquid electrolyte substance to saturate or wet the first separator layer 190 or the second separator layer 195. The pouch 600 can comprise adjacent portions of the first separator layer 190 or the second separator layer 195 that have been joined. For example, the first portion 320 of the second separator layer 195 can be joined at an edge with the second portion 330 of the second separator layer, such that any other layers positioned between the folded first stack portion 305 and the second stack portion 325 would be retained between the first portion 320 and the second portion 330 of the second separator layer 195. For example, the first portion 315 and the second portion 335 of the second layer 160, the first portion 310 and the second portion 340 of the first separator layer 190 and the first layer 145 can be sandwiched between the first portion 320 and the second portion 330 of the second separator layer 195, as shown in FIG. 3. With the first portion 320 and the second portion 330 of the second separator layer 195 joined at least one edge, the first portion 315 and the second portion 335 of the second layer 160, the first portion 310 and the second portion 340 of the first separator layer 190 and the first layer 145 can be retained between the first portion 320 and the second portion 330 of the second separator layer 195. The battery layer stack 199 can include additional pouches formed by joining at least one edge of adjacent portions of the first separator layer 190 or the second separator layer 195, for example.

Figure 7:
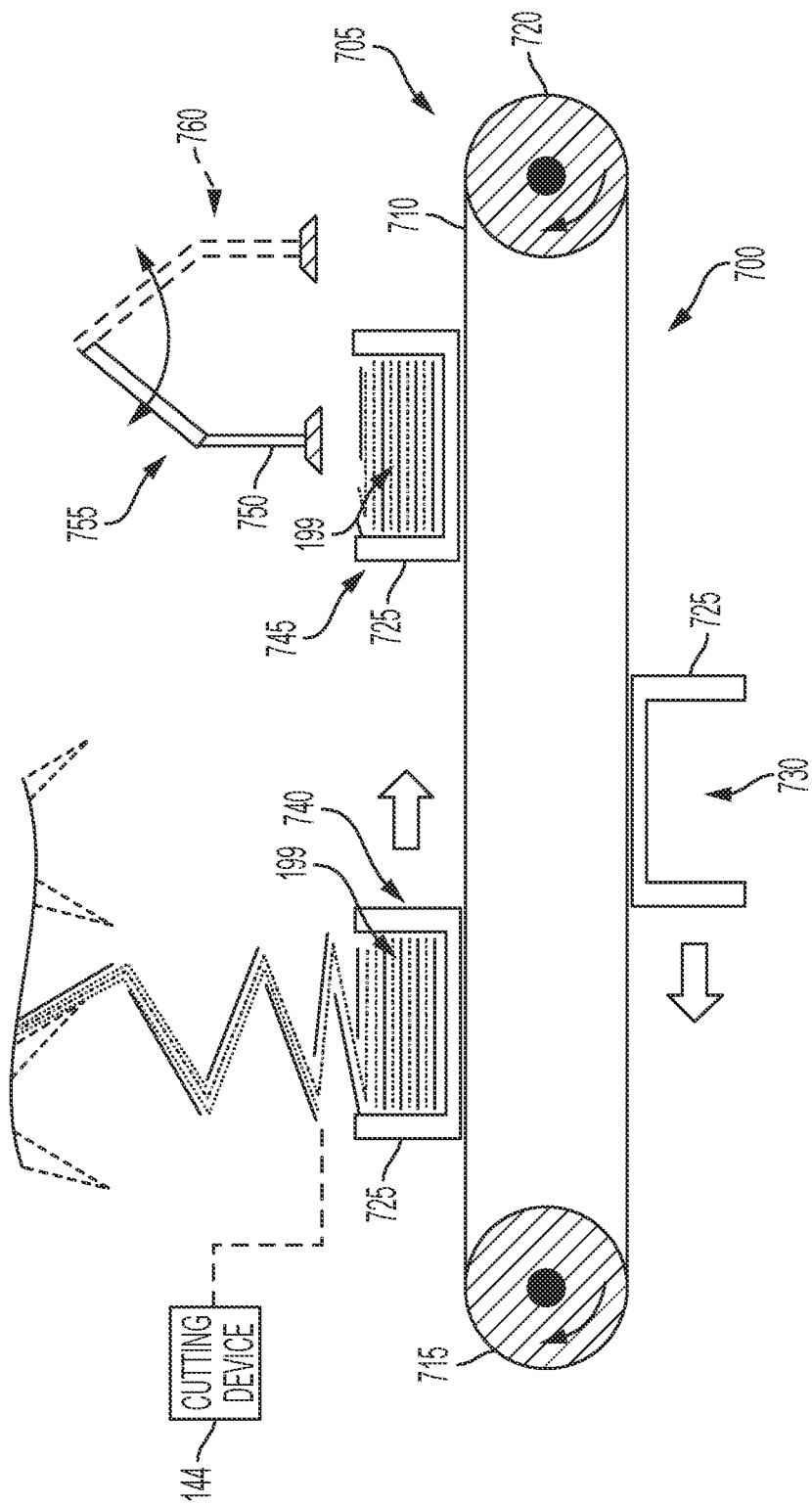
FIG. 7 depicts an example system for manufacturing a battery cell, in accordance with some aspects.

FIG. 7 depicts an apparatus 700 for collecting a battery layer stack 199 produced by the system 100 shown in FIGS. 1, 2, and 4. The apparatus 700 can include a conveyor mechanism 705. The conveyor mechanism can include a conveyor surface 710. The conveyor surface 710 can be a rubberized belt or a similar conveyor belt device. The conveyor surface 710 can also include a plurality of slats joined together on a chassis, where the slats could comprise a metal material, a rubberized material, a plastic material, or some combination thereof. The conveyor mechanism 705 can also include a first roller 715 and a second roller 720. At least one of the first roller 715 and the second roller 720 can be operatively coupled with a motor or other drive mechanism that can cause the first roller 715 or the second roller 720 to rotate. The first roller 715 or the second roller 720 can rotate in a clockwise or a counterclockwise direction. The first roller 715 or the second roller 720 can be operatively coupled with the conveyor surface 710. The first roller 715 or the second roller 720 can support the conveyor surface, for example. A rotation of the first roller 715 or the second roller 720 can cause the conveyor surface to move (e.g., translate) according to a direction of rotation of the first roller 715 or the second roller 720.

The system 100 can include at least one receptacle 725 to collect the first stack portion 305 and the second stack portion 325. For example, the receptacle 725 can be positioned on or coupled with the conveyor surface 710 of the apparatus. The receptacle 725 can be positioned beneath the first rotator 102 and the second rotator 104. For example, the receptacle can define a cavity 730 that can receive the first stack portion 305 and the second stack portion 325 as the first stack portion 305 and the second stack portion 325 move downwards from the first rotator 102 and the second rotator 104 after the layers of the first stack portion 305 and the second stack portion 325 have been joined via mating (e.g., meshing, contacting, integrating, engaging, or aligning) platens. The receptacle 725 can collect a battery layer stack 199 comprising a plurality of stack portions, such as the first stack portion 305, the second stack portion 325, a third stack portion 345, or other stack portions.

The apparatus 700 can include a cutting device 735. Because the second layer 160, the first separator layer 190, or the second separator layer 195 can be continuous sheets (e.g., continuous layers, webs, etc.), the various stack portions comprising the battery layer stack 199 are connected or continuous. When the receptacle 725 is nearing or at a predetermined capacity such that a desired number of continuous battery stacks (e.g., the first stack portion 305, the second stack portion 325, and the third stack portion 345) are within the receptacle 725, the cutting device 735 can cut the second layer 160, the first separator layer 190, or the second separator layer 195 between adjacent portions so that a battery layer stack 199 can be removed from subsequent stack portions. For example, the cutting device 735 can cut the second layer 160, the first separator layer 190, or the second separator layer 195 after the third stack portion 345 has been deposited into the receptacle 725, but before a fourth stack portion is deposited into the receptacle 725. Accordingly, the battery layer stack 199 in the receptacle 725 can include the first stack portion 305, the second stack portion 325, the third stack portion 345, but not the fourth stack portion. The number of stack portions that are received by a receptacle 725 can vary based on a design or requirement of a battery cell (e.g., battery cell 820 shown in FIGS. 11-14). The apparatus 700 can include a rotation tracking device that monitors or counts the number of rotations of the first rotator 102 or the second rotator 104 in order to determine when the first rotator 102 or the second rotator 104 have rotated a sufficient number of times to produce a desired number of stack portions. For example, with each full rotation of the first rotator 102, the system 100 can produce six stack portions. If eighteen stack portions are desired, the rotation tracking device can determine when the first rotator 102 or the second rotator 104 has rotated three times. Based on a determination that the first rotator 102 or the second rotator 104 has rotated three times, the cutting device 735 can cut the second battery layer 160, the first separator layer 190, or the second separator layer 195 to separate the desired eighteen stack portions from subsequently-produced stack portions, for example. The apparatus 700 can otherwise track the number of stack portions produced by the system 100 and can cause the cutting device 735 to cut the second battery layer 160, the first separator layer 190, or the second separator layer 195 at a desired interval.

The conveyor surface 710 can translate such that the receptacle 725 positioned on the conveyor surface 710 can translate or move from one end of the apparatus 700 to another. For example, the receptacle 725 can be positioned beneath the first rotator 102 and the second rotator 104 and can collect a battery layer stack 199 in a first position 740. The receptacle can be positioned underneath a retrieval device, such as an arm 750, in a second position 745. The receptacle 725 can move between the first position 740 and the second position 745 as the conveyor surface 710 moves along based on a movement of the first roller 715 or the second roller 720. The receptacle 725 can move from the second position 745 to the first position 740. For example, the receptacle 725 can move with the conveyor surface 710 in a first direction from the first position 740 to the second position 745, and in the same direction from the second position 745 to the first position 740 by traveling around the conveyor surface 710, which can wrap around and underneath the first roller 715 and the second roller 720.

The apparatus 700 can include an arm 750. The arm 750 can grab, grasp, lift, or otherwise retrieve a battery layer stack 199 from the receptacle 725. The arm 750 can move between a first position 755 and a second position 760. For example, the arm 750 can retrieve the battery layer stack 199 from the receptacle 725 in the first position 755. The arm 750 can move from the first position 755 to the second position 760 while the arm 750 is grasping or holding the battery layer stack 199. The arm 750 can deposit the battery layer stack 199 in the second position 760. For example, the arm 750 can provide the battery layer stack 199 to another machine, device, or operator for further manufacturing operations.

The system 100 can include a second receptacle 725 to collect the battery layer stack 199. For example, at least one receptacle 725 can be positioned on the conveyor surface 710. A plurality of receptacles 725 can be spaced apart on the conveyor surface 710 at a distance that is approximately equal to a distance between the first position 740 and the second position 745. For example, as the conveyor surface 710 moves from the first position 740 to the second position 745, at least one receptacle 725 can move from the first position 740 underneath the first rotator 102 and the second rotator 104 to the second position 745 underneath the arm 750. In the second position 745, the receptacle 725 can be positioned underneath the arm 750, where the arm 750 is in the first position 755.

Figure 8:
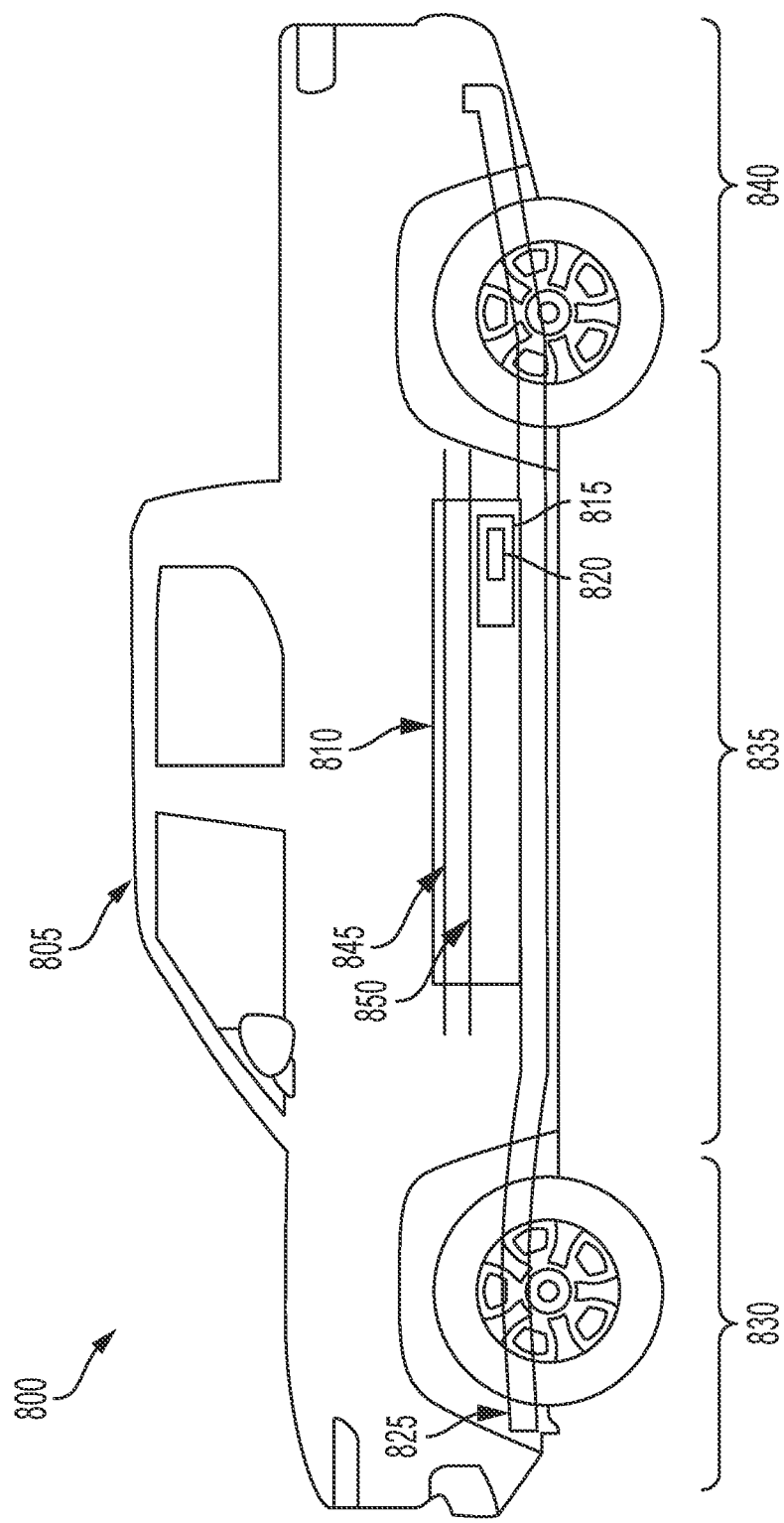
FIG. 8 depicts an example electric vehicle, in accordance with some aspects.

FIG. 8 depicts an example cross-sectional view 800 of an electric vehicle 805 installed with at least one battery pack 810. Electric vehicles 805 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 810 can also be used as an energy storage system to power a building, such as a residential home or commercial building. Electric vehicles 805 can be fully electric or partially electric (e.g., plug-in hybrid) and further, electric vehicles 805 can be fully autonomous, partially autonomous, or unmanned. Electric vehicles 805 can also be human operated or non-autonomous. Electric vehicles 805 such as electric trucks or automobiles can include on-board battery packs 810, battery modules 815, or battery cells 820 to power the electric vehicles. The electric vehicle 805 can include a chassis 825 (e.g., a frame, internal frame, or support structure). The chassis 825 can support various components of the electric vehicle 805. The chassis 825 can span a front portion 830 (e.g., a hood or bonnet portion), a body portion 835, and a rear portion 840 (e.g., a trunk, payload, or boot portion) of the electric vehicle 805. The battery pack 810 can be installed or placed within the electric vehicle 805. For example, the battery pack 810 can be installed on the chassis 825 of the electric vehicle 805 within one or more of the front portion 830, the body portion 835, or the rear portion 840. The battery pack 810 can include or connect with at least one busbar, e.g., a current collector element. For example, the first busbar 845 and the second busbar 850 can include electrically conductive material to connect or otherwise electrically couple the battery modules 815 or the battery cells 820 with other electrical components of the electric vehicle 805 to provide electrical power to various systems or components of the electric vehicle 805.

Figure 9:
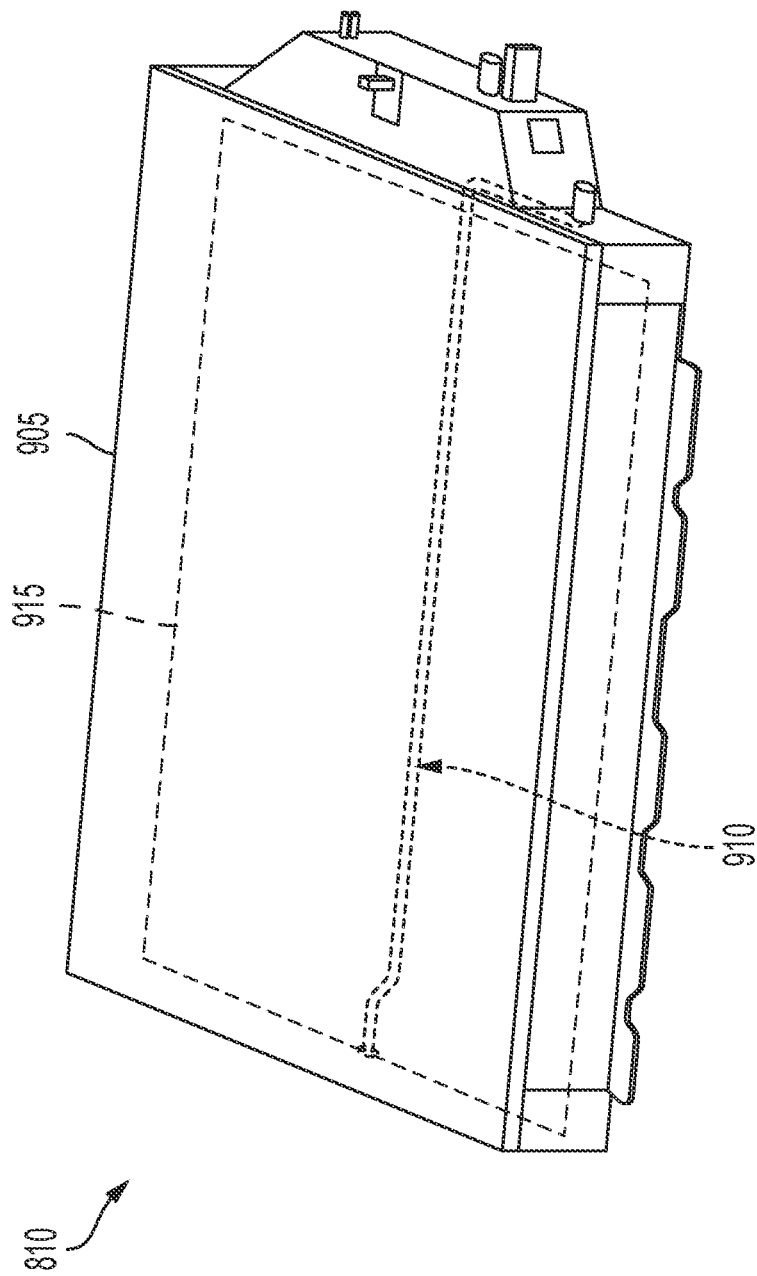
FIG. 9 depicts an example battery pack, in accordance with some aspects.

FIG. 9 depicts an example battery pack 810. Referring to FIG. 9, among others, the battery pack 810 can provide power to electric vehicle 805. Battery packs 810 can include any arrangement or network of electrical, electronic, mechanical or electromechanical devices to power a vehicle of any type, such as the electric vehicle 805. The battery pack 810 can include at least one housing 905. The housing 905 can include at least one battery module 815 or at least one battery cell 820, as well as other battery pack components. The housing 905 can include a shield on the bottom or underneath the battery module 815 to protect the battery module 815 from external conditions, for example if the electric vehicle 805 is driven over rough terrains (e.g., off-road, trenches, rocks, etc.) The battery pack 810 can include at least one cooling line 910 that can distribute fluid through the battery pack 810 as part of a thermal/temperature control or heat exchange system that can also include at least one thermal component (e.g., cold plate) 915. The thermal component 915 can be positioned in relation to a top submodule and a bottom submodule, such as in between the top and bottom submodules, among other possibilities. The battery pack 810 can include any number of thermal components 915. For example, there can be one or more thermal components 915 per battery pack 810, or per battery module 815. At least one cooling line 910 can be coupled with, part of, or independent from the thermal component 915.

Figure 10:
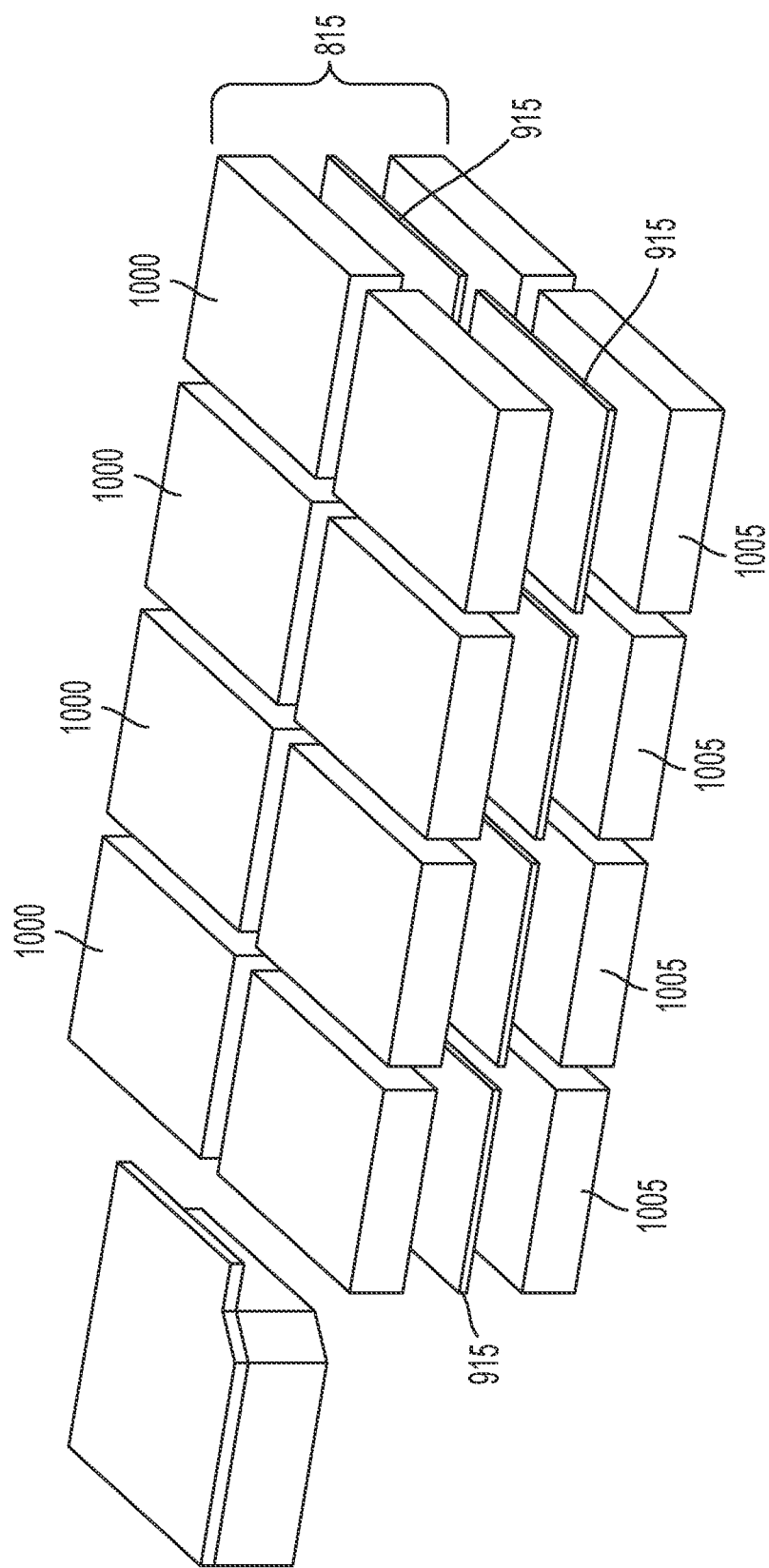
FIG. 10 depicts an example battery module, in accordance with some aspects.

FIG. 10 depicts example battery modules 815, and FIGS. 11-14 depict an example cross sectional view of a battery cell 820. The battery modules 815 can include at least one submodule. For example, the battery modules 815 can include at least one first (e.g., top) submodule 1000 or at least one second (e.g., bottom) submodule 1005. At least one thermal component 915 can be disposed between the top submodule 1000 and the bottom submodule 1005. For example, one thermal component 915 can be configured for heat exchange with one battery module 815. The thermal component 915 can be disposed or thermally coupled between the top submodule 1000 and the bottom submodule 1005. One thermal component 915 can also be thermally coupled with more than one battery module 815 (or more than two submodules 1000, 1005). The battery submodules 1000, 1005 can collectively form one battery module 815. In some examples each submodule 1000, 1005 can be considered as a complete battery module 815, rather than a submodule.

The battery modules 815 can each include a plurality of battery cells 820. The battery modules 815 can be disposed within the housing 905 of the battery pack 810. The battery modules 815 can include battery cells 820 that are cylindrical cells or prismatic cells, for example. The battery module 815 can operate as a modular unit of battery cells 820. For example, a battery module 815 can collect current or electrical power from the battery cells 820 that are included in the battery module 815 and can provide the current or electrical power as output from the battery pack 810. The battery pack 810 can include any number of battery modules 815. For example, the battery pack can have one, two, three, four, five, six, seven, eight, nine, ten, eleven, twelve or other number of battery modules 815 disposed in the housing 905. It should also be noted that each battery module 815 may include a top submodule 1000 and a bottom submodule 1005, possibly with a thermal component 915 in between the top submodule 1000 and the bottom submodule 1005. The battery pack 810 can include or define a plurality of areas for positioning of the battery module 815. The battery modules 815 can be square, rectangular, circular, triangular, symmetrical, or asymmetrical. In some examples, battery modules 815 may be different shapes, such that some battery modules 815 are rectangular but other battery modules 815 are square shaped, among other possibilities. The battery module 815 can include or define a plurality of slots, holders, or containers for a plurality of battery cells 820.

Figure 11:
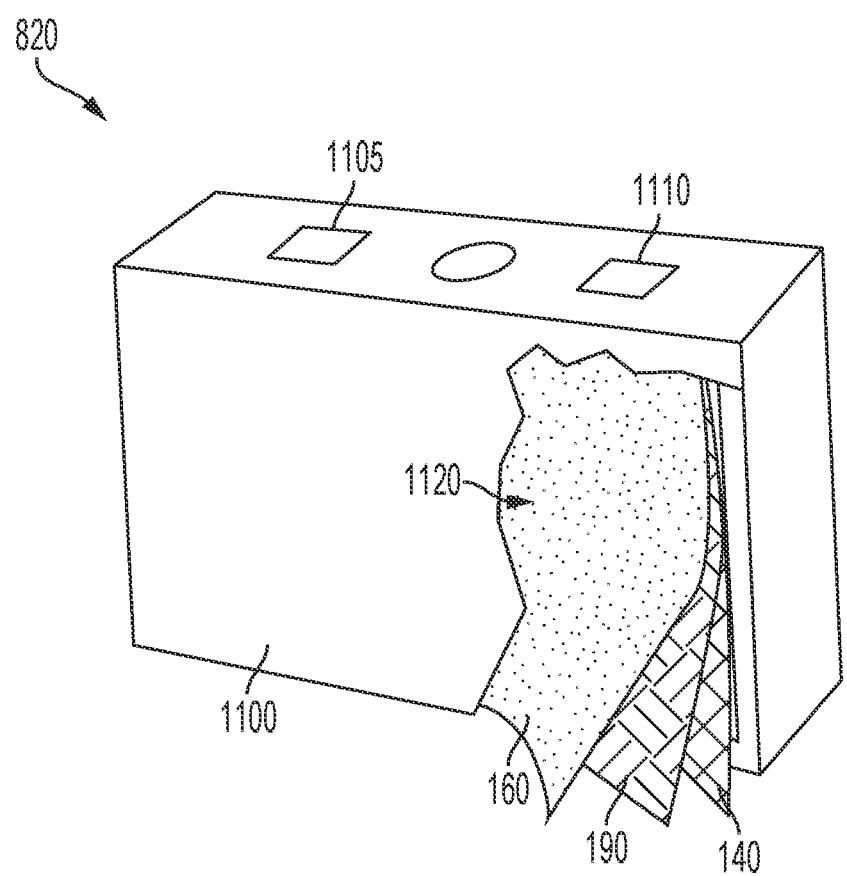
FIG. 11 depicts an example cross-sectional view of a battery cell, in accordance with some aspects.
Figure 12:
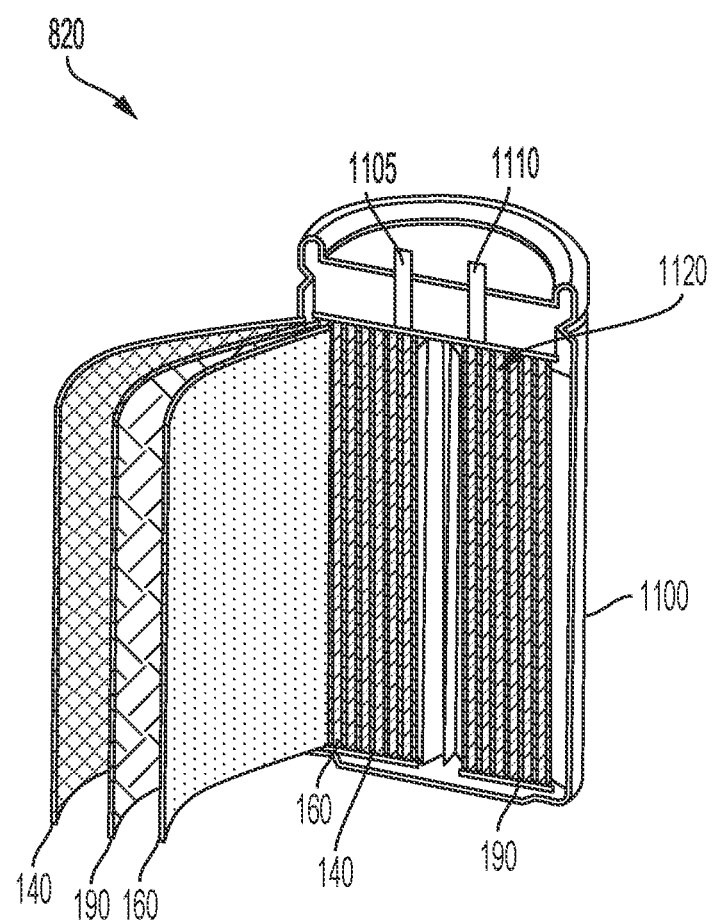
FIG. 12 depicts an example cross-sectional view of a battery cell, in accordance with some aspects.
Figure 13:
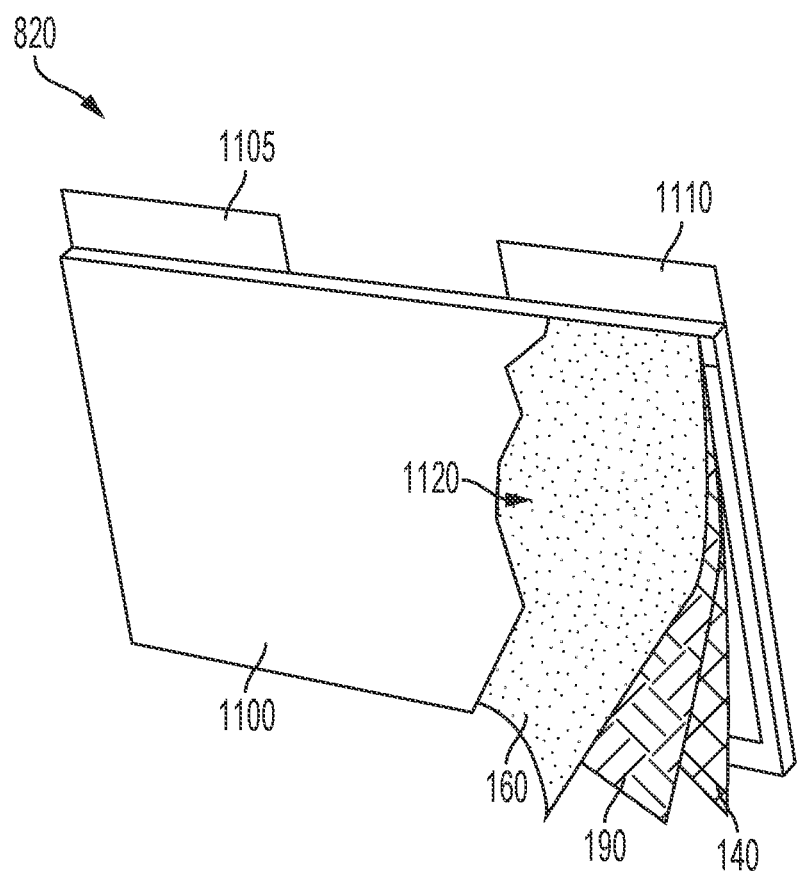
FIG. 13 depicts an example cross-sectional view of a battery cell, in accordance with some aspects.

Battery cells 820 have a variety of form factors, shapes, or sizes. For example, battery cells 820 can have a cylindrical, rectangular, square, cubic, flat, pouch, or prismatic form factor. As depicted in FIG. 11, for example, battery cells 820 can be prismatic. As depicted in FIG. 12, for example, battery cells 820 can be cylindrical. As depicted in FIG. 13, for example, battery cells 820 can include a pouch form factor. As depicted in FIGS. 14 and 14A, for example, the battery cells 820 can include one or more continuous layers, such as a continuous anode layer, a continuous separator or electrolyte layer (e.g., polymeric separator layer wetted by a liquid electrolyte, solid-state electrolyte), or some other continuous layer. For example, the battery cell 820 can include at least one continuous separator layer that receives (e.g., becomes wetted by, becomes saturated with) a liquid electrolyte material during a filling step subsequent to an operation stacking the separator layer with one or more electrode (e.g., cathode or anode) layers. The battery cell 820 can include an electrolyte layer where the electrolyte layer can be or include solid electrolyte material that can conduct ions. For example, the solid electrolyte layer can conduct ions without receiving a separate liquid electrolyte material. Battery cells 820 can be assembled, for example, by inserting a winded or stacked electrode roll (e.g., a jelly roll) including electrolyte material into at least one battery cell housing 1100. The electrolyte material, e.g., an ionically conductive fluid or other material, can generate or provide electric power for the battery cell 820. A first portion of the electrolyte material can have a first polarity, and a second portion of the electrolyte material can have a second polarity. The housing can be of various shapes, including cylindrical, prismatic, pouch-shaped, or some other form factor. Electrical connections can be made between the electrodes of the battery cell 820. For example, electrical connections with at least some of the electrolyte material can be formed at two points or areas of the battery cell 820, for example to form a first polarity terminal 1105 (e.g., a positive or anode terminal) and a second polarity terminal 1110 (e.g., a negative or cathode terminal). The polarity terminals can be made from electrically conductive materials to carry electrical current from the battery cell 820 to an electrical load, such as a component or system of the electric vehicle 805.

For example, the battery cell 820 can include a lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide or phosphate material. The electrolyte material can be disposed in the battery cell 820 to separate the anode and cathode from each other and to facilitate transfer of lithium ions between the anode and cathode. It should be noted that battery cell 820 can also take the form of a solid-state battery cell developed using solid electrodes and solid electrolytes. Solid electrodes or electrolytes can be or include organic polymeric-based electrolytes or inorganic electrolytes, for example phosphide-based or Sulfide-based solid-state electrolytes (e.g., $Li_3PS_4$, $Li_7P_3S_{11}$, $Li_2S—P_2S_5$, $Li_6PS_5Cl$). Yet further, some battery cells 820 can be solid-state battery cells and other battery cells 820 can include liquid electrolytes for lithium-ion battery cells.

The battery cell 820 can be included in battery modules 815 or battery packs 810 to power components of the electric vehicle 805. The battery cell housing 1100 can be disposed in the battery module 815, the battery pack 810, or a battery array installed in the electric vehicle 805. The housing 1100 can be of any shape. For example, as shown in FIGS. 11 and 14, among others, the housing 1100 of the battery cell 820 can be prismatic with a polygonal base. As shown in FIG. 12, among others, the housing 1100 of the battery cell 820 can be cylindrical with a circular (e.g., as depicted in FIG. 12), elliptical, or ovular base. As shown in FIG. 13, among others, the housing 1100 of the battery cell 820 can include a pouch form factor.

The housing 1100 of the battery cell 820 can include one or more materials with various electrical conductivity or thermal conductivity, or a combination thereof. The electrically conductive and thermally conductive material for the housing 1100 of the battery cell 820 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 1100 of the battery cell 820 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 1100 of the battery cell 820 is prismatic (e.g., as depicted in FIGS. 11 and 14, among others) or cylindrical (e.g., as depicted in FIG. 12, among others), the housing 1100 can include a rigid or semi-rigid material such that the housing 1100 is rigid or semi-rigid (e.g., not easily deformed or manipulated into another shape or form factor). In examples where the housing 1100 includes a pouch form factor, (e.g., as depicted in FIG. 13, among others), the housing 1100 can include a flexible, malleable, or non-rigid material such that the housing 1100 can be bent, deformed, manipulated into another form factor or shape.

The battery cell can include a first layer 145 and a third layer 150. For example, the battery cell 820 can include the first layer 145 and the third layer 150 comprising a cathode material (e.g., a composite cathode layer compound cathode layer, a compound cathode, a composite cathode, or a cathode). The first layer 145 and the third layer 150 can be disposed within the cavity 1120. The first layer 145 can include a first redox potential. The third layer 150 can include a third redox potential. The first redox potential can be the same as or different than the third redox potential. The first layer 145 and the third layer 150 can output electrical current out from the battery cell 820 and can receive electrons during the discharging of the battery cell 820. The first layer 145 and the third layer 150 can also release lithium ions during the discharging of the battery cell 820. Conversely, the first layer 145 and the third layer 150 can receive electrical current into the battery cell 820 and can output electrons during the charging of the battery cell 820. The first layer 145 and the third layer 150 can receive lithium ions during the charging of the battery cell 820. The first layer 145 and the third layer 150 can be separate layers, where each of the first layer 145 and the third layer 150 includes a length, width, and thickness. The first layer 145 and the third layer 150 can be disconnected or discontinuous with each other.

The battery cell 820 can include a second layer 160. For example, the battery cell 820 can include at least one anode layer, such as second layer 160, which can be disposed within the cavity 1120 defined by the housing 1100. The second layer 160 can include a second redox potential that can be different from the first redox potential and the third redox potential of the first layer 145 and third layer 150, respectively. For example, the second layer 160 can be an anode material that can receive electrical current into the battery cell 820 and output electrons during the operation of the battery cell 820 (e.g., charging or discharging of the battery cell 820). The second layer 160 can include an active substance. The active substance can include, for example, an activated carbon or a material infused with conductive materials (e.g., artificial or natural Graphite, or blended), lithium titanate ($Li_4T_{15}O_{12}$), or a silicon-based material (e.g., silicon metal, oxide, carbide, pre-lithiated). The active substance can include graphitic carbon (e.g., ordered or disordered carbon with sp2 hybridization), Li metal anode, or a silicon-based carbon composite anode. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state. The second layer 160 can include a first side 162 and a second side 164, as shown in FIGS. 1 and 3.

The redox potential of layers (e.g., the first redox potential of the first layer 145, the second redox potential of the second layer 160, or the third redox potential of the third layer 150) can vary based on a chemistry of the respective layer or a chemistry of the battery cell 820. For example, lithium-ion batteries can include an LFP (lithium iron phosphate) chemistry, an NMC (Nickel Manganese Cobalt) chemistry, an NCA (Nickel Cobalt Aluminum) chemistry, or an LCO (lithium cobalt oxide) chemistry for a cathode layer (e.g., the first layer 145, the third layer 150, or other layers). Lithium-ion batteries can include a graphite chemistry, a silicon-graphite chemistry, or a lithium metal chemistry for the anode layer (e.g., the second layer 160). For example, a cathode layer having an LFP chemistry can have a redox potential of 3.45V, while an anode layer having a graphite chemistry can have a 0.25V redox potential.

Electrode layers can include anode active material or cathode active material, commonly in addition to a conductive carbon material, a binder, other additives as a coating on a current collector (metal foil). The chemical composition of the electrode layers can affect the redox potential of the electrode layers. For example, cathode layers (e.g., the first layer 145, the second layer 150, etc.) can include high-nickel content (>80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP"). Anode layers (e.g., the second layer 160) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (Plpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which a battery active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

As shown in FIGS. 14 and 14A, among others, the battery cell 820 can include the second layer 160 that is continuous. For example, the second layer 160 can include a first portion 315 that is continuous with a second portion 335. The second layer 160 can include a plurality of portions that are continuous (e.g., connected, integral, joined, etc.). The first portion 315 of the second layer 160 can be a portion of the continuous second layer 160 having a length that is approximately equal to or greater than a length or width of the first layer 145. Because the second layer 160 can be a continuous layer, the second layer 160 can continue beyond the first portion 315 to the second portion 335. The second portion 335 of the second layer 160 can be a portion of the continuous second layer 160 having a length that is approximately equal to or greater than a length or width of the first layer 145. Because the second battery layer can be a continuous layer, the second layer 160 can be continue beyond the second portion 335 to the first portion 315 or to another portion (e.g., the third portion 355).

The battery cell 820 can include the first portion 315 of the second layer 160 stacked with the first layer 145 to form a first stack portion 305. For example, the first stack portion 305 can include the first layer 145 joined to the first portion 315 of the second layer 160. The first layer 145 and the first portion 315 of the second layer 160 can be directly joined where there are no other layers in between the first layer 145 and the first portion 315 of the second layer 160. The first layer 145 and the first portion 315 of the second layer 160 can be indirectly joined such that at least one layer separating the first layer 145 and the first portion 315 of the second layer 160. The first layer 145 can be joined with the first portion 315 of the second battery layer using a joining method. For example, the first layer 145 can be joined with the first portion 315 of the second layer 160 using heat, adhesive (e.g., glue), liquid surface tension, or some combination thereof.

The battery cell 820 can include the second portion 335 of the second layer 160 stacked with the third layer 150 to form a second stack portion 325. For example, the second stack portion 325 can include the third layer 150 joined to the second portion 335 of the second layer 160. The third layer 150 and the second portion 335 of the second layer 160 can be directly joined where there are no other layers in between the third layer 150 and the second portion 335 of the second layer 160. The third layer 150 and the second portion 335 of the second layer 160 can be indirectly joined such that at least one layer separating the third layer 150 and the second portion 335 of the second layer 160. The third layer 150 can be joined with the second portion 335 of the second battery layer using a joining method. For example, the third layer 150 can be joined with the second portion 335 of the second layer 160 using heat, adhesive (e.g., glue), liquid surface tension, or some combination thereof.

The battery cell 820 can include a first separator layer 190 and a second separator layer 195. For example, the battery cell 820 can include an electrolyte layer disposed within the cavity 1120. The first separator layer 190 or the second separator layer 195 can be arranged between the first portion 315 of the second layer 160 and the first layer 145 to separate the first portion 315 of the second layer 160 and the first layer 145. The first separator layer 190 or the second separator layer 195 can be arranged between the second portion 335 of the second layer 160 and the third layer 150 to separate the second portion 335 of the second layer 160 and the third layer 150. The first separator layer 190 or the second separator layer 195 can transfer ions between the second layer 160 and the first layer 145 or third layer 150. The first separator layer 190 or the second separator layer 195 can transfer cations from the second layer 160 and the first layer 145 or third layer 150 during the operation of the battery cell 820. The first separator layer 190 or the second separator layer 195 can transfer anions (e.g., lithium ions) from the first layer 145 or the third layer 150 to the second layer 160 during the operation of the battery cell 820. The battery cell 820 can include only one separator layer (e.g., first separator layer 190 only or second separator layer 195 only). The battery cell 820 can include two or more separator layers.

The first separator layer 190 or the second separator layer 195 can include or be made of a liquid electrolyte material. For example, the first separator layer 190 or the second separator layer 195 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the first separator layer 190 or the second separator layer 195 can include, for example, lithium tetrafluoroborate (LiBF$_4$), lithium hexafluorophosphate (LiPF$_6$), and lithium perchlorate (LiClO$_4$), among others. The solvent can include, for example, dimethyl carbonate (DMC), ethylene carbonate (EC), and diethyl carbonate (DEC), among others. The first separator layer 190 or the second separator layer 195 can include or be made of a solid electrolyte material, such as a ceramic electrolyte material, polymer electrolyte material, or a glassy electrolyte material, or among others, or any combination thereof. The ceramic electrolyte material for the first separator layer 190 or the second separator layer 195 can include, for example, lithium phosphorous oxy-nitride (Li$_x$PO$_y$N$_z$), lithium germanium phosphate sulfur (Li$_{10}$GeP$_2$S$_{12}$), Yttria-stabilized Zirconia (YSZ), NASICON (Na$_3$Zr$_2$Si$_2$PO$_{12}$), beta-alumina solid electrolyte (BASE), perovskite ceramics (e.g., strontium titanate (SrTiO$_3$)), among others. The polymer electrolyte material (e.g., a hybrid or pseudo-solid state electrolyte) for first separator layer 190 or the second separator layer 195 can include, for example, polyacrylonitrile (PAN), polyethylene oxide (PEO), polymethyl-methacrylate (PMMA), and polyvinylidene fluoride (PVDF), among others. Whether the separator layer 190 or the second separator layer 195 are separator layers that can receive a liquid electrolyte (e.g., lithium ion batteries) or electrolyte layers that can conduct ions without receiving a liquid electrolyte (e.g., solid-state batteries), the glassy electrolyte material for the first separator layer 190 or the second separator layer 195 can include, for example, lithium sulfide-phosphor pentasulfide ($Li_2S$—$P_2S_5$), lithium sulfide-boron sulfide ($Li_2S$—$B_2S_3$), and Tin sulfide-phosphor pentasulfide ($SnS$—$P_2S_5$), among others.

In examples where the first separator layer 190 or the second separator layer 195 include a liquid electrolyte material, the first separator layer 190 or the second separator layer 195 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The separator layer 190 or the second separator layer 195 can include at least one additive. The additives can be or include vinylidene carbonate, fluoroethylene carbonate, ethyl propionate, methyl propionate, methyl acetate, ethyl acetate, or a mixture of any two or more thereof. The first separator layer 190 or the second separator layer 195 can include a lithium salt material. For example, the lithium salt can be lithium perchlorate, lithium hexafluorophosphate, lithium bis(fluorosulfonyl)imide, lithium bis(trifluorosulfonyl)imide, or a mixture of any two or more thereof. The lithium salt may be present in the first separator layer 190 or the second separator layer 195 from greater than 0 M to about 1.5 M.

The battery cell 820 can include the first separator layer 190 and the second separator layer 195. For example, the battery cell 820 can include the first separator layer 190 that comprises the same material or chemical composition as the second separator layer 195. In other examples, the first separator layer 190 can comprises the different material or chemical composition than the second separator layer 195. The first separator layer 190 can be positioned adjacent to one side of the second layer 160 (e.g., adjacent to the first side 162). The second separator layer 195 can be positioned adjacent to another side of the second layer 160 (e.g., adjacent to the second side 164).

As shown in FIGS. 14 and 14A, among others, the battery cell 820 can include the first separator layer 190 that is continuous. The battery cell 820 can include the first separator layer 190 between the first layer 145 and the first portion 315 of the second layer 160. For example, the first separator layer 190 can be positioned between the second layer 160 and the first layer 145. The first side 162 of the second layer 160 can be adjacent to the first separator layer 190. The first side 162 of the first portion 315 of the second layer 160 can be adjacent to the first separator layer 190. The first layer 145 can be adjacent to the first separator layer 190.

As shown in FIGS. 14 and 14A, among others, the battery cell 820 can include the second separator layer 195 that is continuous. The battery cell 820 can include the second separator layer 195 between the third layer 150 and the second portion 335 of the second layer 160. For example, the second separator layer 195 can be positioned between the second layer 160 and the third layer 150. The second side 164 of the second layer 160 can be adjacent to the second separator layer 195. The second side 164 of the second portion 335 of the second layer 160 can be adjacent to the second separator layer 195. The third layer 150 can be adjacent to the second separator layer 195.

The battery cell 820 can include the first layer 145 including a first side 385 and a second side 390. The battery cell 820 can include the first separator layer 190 to contact the first side 385 and the second side 390 of the first layer 145. For example, and as shown in FIG. 3, the first side 385 can be adjacent to the second portion 340 of the first separator layer 190 with the first stack portion 305 stacked with the second stack portion 325 in the battery layer stack 199. The second side 390 of the first layer 145 can be adjacent to the first portion 310 of the first separator layer 190. The first layer 145 can contact (e.g., mate with, be joined with, etc.) only the first portion 310 and the second portion 340 of the first separator layer 190. In other examples, the first layer 145 can indirectly contact the first separator layer. For example, another layer could be disposed between the first side 385 of the first layer 145 and the first portion 310 of the first separator layer 190. Another layer could be disposed between the second side 390 of the first layer 145 and the second portion 340 of the first separator layer 190.

Figure 15:
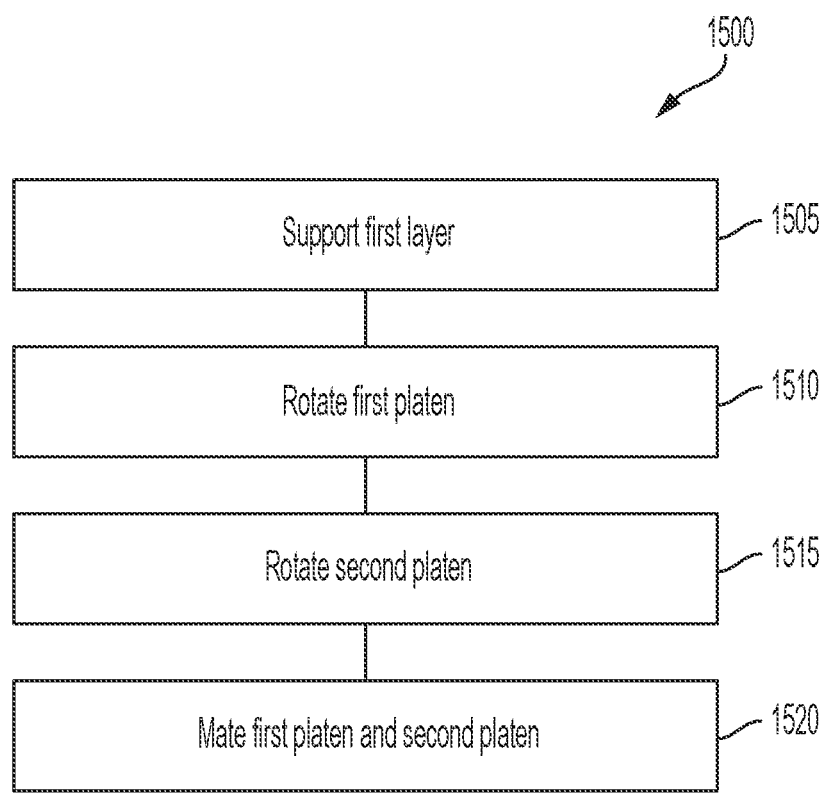
FIG. 15 is a flow diagram of an example method, in accordance with some aspects.

FIG. 15 depicts an example method 1500 of manufacturing a battery cell. For example, the method 1500 can be performed by the system 100 depicted in FIGS. 1 and 2. The method 1500 can include one or more of ACTS 1505-1520.

The method 1500 can include supporting a first layer at ACT 1505. For example, the first surface 115 of the first platen 105 can support the first layer 145. The first layer 145 can comprise the first material 140. The first layer 145 can be cut from the roll 141 of first material 140 by the cutting device 144. The first platen 105 can be configured to rotate with the first rotator 102 in the first direction 110. The first surface 115 of the first platen 105 can include a raised edge 510 proximate to the second end 505 of the first platen 105. The raised edge 510 can position the first layer 145 on the first platen 105 as the first platen 105 rotates in the first direction 110.

The method 1500 can include an aperture in fluid communication with a pump to hold the first layer 145 against the first surface 115 of the first platen 105 at ACT 1505. For example, the vacuum system 515 can be fluidly coupled with an aperture 520 defined in the first surface 115 of the first platen 105. At least one pump of the vacuum system 515 can create a vacuum or apply a vacuum pressure to the first surface 115 via the aperture 520. The first layer 145 can be positioned over the aperture 520. The vacuum pressure applied by the pump via the aperture 520 can hold, retain, or secure the first layer 145 against the first surface 115 of the first platen 105. For example, vacuum pressure can be applied to first side 385 of the first layer 145. A vacuum can be created between the first side 385 of the first layer 145 and the first surface 115 of the first platen 105. The first layer 145 can be placed on the first surface 115 of the first platen 105 with the first platen 105 in a first position that includes the first surface 115 facing upwards.

The method 1500 can include rotating the first platen 105 at ACT 1510. For example, the method 1500 can include rotating the first platen 105 in the first direction 110 about the first axis. The first platen 105 can rotate from the first position where the first surface 115 is facing substantially upwards (e.g., and where the first layer 145 is placed on the first surface 115. The first platen 105 can rotate to a second position where the first surface 115 is facing downwards. The first platen 105 can rotate approximately 180 degrees from the first position where the first layer 145 is placed on the first surface 115 (e.g., a position where the first surface 115 is facing upwards) to the second position where the first platen 105 can mate with another platen (e.g., the second platen 125) of the second rotator 104 (e.g., a position where the first surface 115 is facing downwards).

The method 1500 can include rotating the first platen 105 to contact the first portion 315 of the second layer 160 at ACT 1510. For example, the first surface 115 or the first layer 145 that is supported by the first surface 115 of the first platen 105 can indirectly contact the first portion 315 of the second layer 160 where another material (e.g., a portion of the first separator layer 190) is positioned between the first portion 315 of the second layer 160 and the first surface 115 or first layer 145. The first surface 115 or the first layer 145 supported by the first surface 115 can directly contact the first portion 315 of the second layer 160 in some examples.

The method 1500 can include rotating the second platen 125 at ACT 1515. For example, the method 1500 can include rotating the second platen 125 in the second direction 130 about the second axis. The second platen 125 can rotate approximately 180 degrees from a first position where the second platen 125 is oriented substantially horizontally (e.g., ±30 degrees from a horizontal) with a first surface of the second platen facing upwards. The second platen 125 can rotate to a second position where the second platen is oriented substantially horizontally (e.g., ±30 degrees from a horizontal) with the second surface 135 of the second platen 125 facing upwards.

The method 1500 can include mating the first platen 105 with the second platen 125 at ACT 1520. For example, the method 1500 can include the second surface 135 of the second platen 125 that mates with the first surface 115 of the first platen 105. The first surface 115 of the first platen 105 can contact, interact with, interlock, mesh, or approach the second surface 135 of the second platen 125. As the first rotator 102 rotates the first platen 105 in the first direction 110 and as the second rotator 104 rotates the second platen 125 in the second direction 130, the first platen 105 and the second platen 125 will approach one another between the two rotators 102, 104 as shown in FIG. 1 and in detail in FIG. 2. The first platen 105 of the first rotator 102 and the second platen 125 of the second rotator 104 can periodically and temporarily mesh or mate as the first platen 105 and the second platen 125 rotate, similar to that of teeth of meshing gears, for example. More particularly, the first surface 115 of the first platen 105 can mate, mesh with, contact, interact with, or approach the second surface 135 of the second platen 125 as the first platen 105 and the second platen 125 rotate. For example, at least a portion of the first surface 115 of the first platen 105 and at least a portion of the second surface 135 of the second platen 125 can contact (e.g., touch) as the first platen 105 and the second platen 125 rotate. In some examples, the first platen 105 and the second platen 125 can approach, but not touch each other, as the first platen 105 and the second platen 125 rotate such that a gap or opening exists between the first surface 115 of the first platen 105 and the second surface 135 of the second platen 125 when the first surface 115 mates with the second surface 135.

The system 100 can include the mating the first platen 105 with the second platen 125 to stack the first layer 145 and the first portion 315 of the second layer 160. For example, the first surface 115 of the first platen 105 can support the first layer 145 and can contact the first portion 315 of the second layer 160. As the first platen 105 rotates, the first surface 115 can support the first layer 145 and can push or pull the first portion 315 of the second layer 160 towards the second surface 135 of the second platen 125. When the first surface 115 of the first platen 105 and the second surface 135 of the second platen 125 mate (e.g., mesh, contact, interact, engage, or align), the first layer 145 and the first portion 315 of the second layer 160 can be stacked together. For example, the first layer 145 can be compressed against the first portion 315 of the second layer 160. In other examples, the first layer 145 can be joined with the first portion 315 of the second battery layer using a joining method. For example, the first layer 145 can be joined with the first portion 315 of the second layer 160 using heat, adhesive (e.g., glue), liquid surface tension, or some combination thereof.

Figure 16:
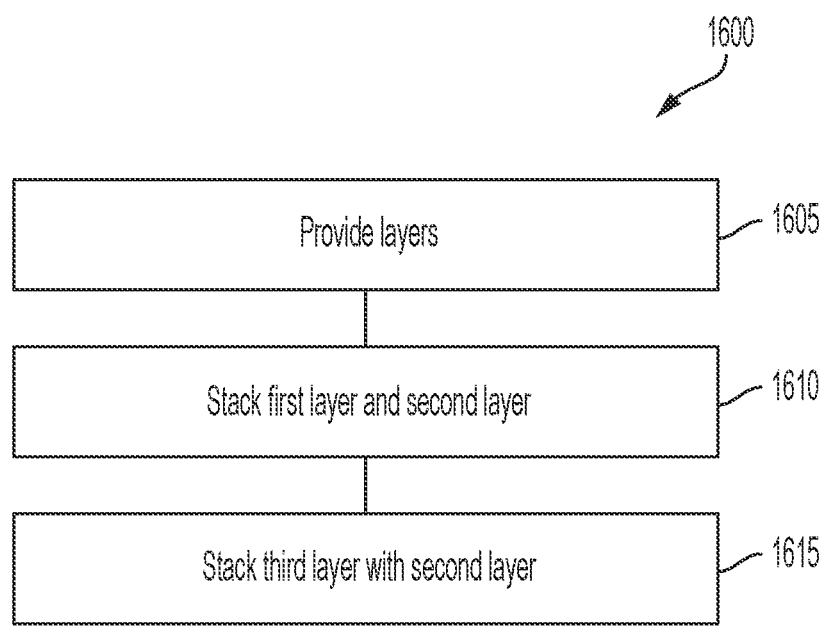
FIG. 16 is a flow diagram of an example method, in accordance with some aspects.

FIG. 16 depicts an example method 1600 of manufacturing a battery. For example, the method 1600 can be performed by the system 100 depicted in FIGS. 1 and 2. The method 1600 can include one or more of ACTS 1605-1615.

The method 1600 can include providing layers at ACT 1605. For example, the method 1600 can include providing a first layer 145, a second layer 160, and a third layer 150. The first layer 145 can be a first electrode layer. The first layer 145 can comprise a battery active material. The first layer 145 can comprise a cathode electrode. The second layer 160 can be a second electrode layer. The second layer 160 can comprise a battery active material. The second layer 160 can comprise an anode electrode. The third layer 150 can be a third electrode layer. The third layer 150 can comprise a battery active material. The third layer 150 can comprise a cathode electrode. The first layer 145 and the third layer 150 can be disconnected or discontinuous. For example, the first layer 145 can be separate layer from the third layer 150, where each of the first layer 145 and the third layer 150 include a length, width, and thickness. The second layer 160 can be a continuous sheet (e.g., layer, web, etc.) that is provided via the roll 161. The second layer 160 can include the first portion 315 and the second portion 335. Each of the first portion 315 and the second portion 335 of the second layer 160 can be approximately the same size or greater than the dimensions of the first layer 145 or the third layer 150.

The method 1600 can include stacking the first layer 145 and the second layer 160 at ACT 1610. For example, the method 1600 can include stacking the first layer 145 with the first portion 315 of the second layer 160 to form a first stack portion 305. The first layer 145 can be supported by the first surface 115 of the first platen 105. The first platen 105 can rotate in the first direction 110 and can contact the first portion 315 of the second layer 160. The first surface 115 of the first platen 105 can mate with the second surface 135 of the second platen 125 to stack the first layer 145 with the first portion 315 of the second layer 160. The first layer 145 and the first portion 315 of the second layer 160 can be indirectly (e.g., with intervening layers) or directly joined to form the first stack portion 305. For example, the first layer 145 could be joined with the first portion 315 of the second layer 160 with adhesive, heat, liquid surface tension, or some combination thereof.

The method 1600 can include stacking the third layer 150 with the second layer 160 at ACT 1615. For example, the method 1600 can include stacking the third layer 150 with the second portion 335 of the second layer 160 to form a second stack portion 325. The third layer 150 can be supported by the first surface 170 of the third platen 165. The third platen 165 can rotate in the second direction 130 and can contact the second portion 335 of the second layer 160. The first surface 170 of the third platen 165 can mate with the second surface 120 of the first platen 105 to stack the third layer 150 with the second portion 335 of the second layer 160. The third layer 150 and the second portion 335 of the second layer 160 can be directly or indirectly (e.g., with intervening layers) joined to form the second stack portion 325. For example, the third layer 150 could be joined with the second portion 335 of the second layer 160 with adhesive, heat, liquid surface tension, or some combination thereof.

Figure 17:
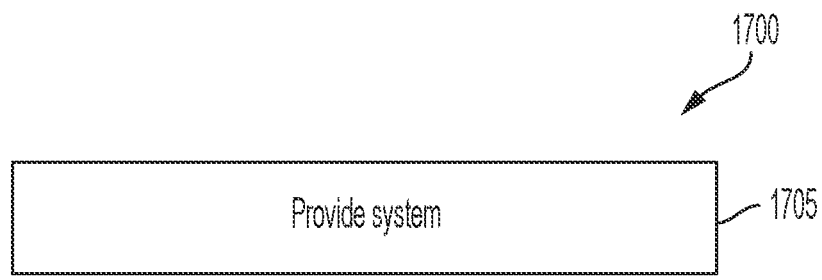
FIG. 17 is a flow diagram of an example method, in accordance with some aspects.

FIG. 17 depicts an example method 1700 of providing a system at ACT 1705. For example, the method 1700 can include providing the system 100 for manufacturing a battery cell. The system 100 can include the first rotator 102 coupled with the first platen 105 and the second rotator 104 coupled with the second platen 125 and the third platen 165. The second layer 160 can be disposed between the first rotator 102 and the second rotator 104. The second layer 160 can be a continuous layer. The first platen 105 can rotate in the first direction 110. The second platen 125 and the third platen 165 can rotate in the second direction 130. The first surface 115 of the first platen 105 can support the first layer 145. The first surface 115 of the first platen 105 or the first layer 145 supported by the first surface 115 can contact the first portion 315 of the second layer 160. The first surface 115 of the first platen 105 can mate with the second surface 135 of the second platen 125 to stack the first layer 145 with the first portion 315 of the second layer 160. The first layer 145 and the first portion 315 of the second layer 160 can be joined to form the first stack portion 305.

The third platen 165 can include the first surface 170 to support the third layer 150. The first surface 170 of the third platen 165 or the third layer 150 supported by the first surface 170 can contact a second portion 335 of the second layer 160. The first surface 170 of the third platen 170 can mate with the second surface 120 of the first platen 105 to stack the third layer 150 with the second portion 335 of the second layer 160. The third layer 150 and the second portion 335 of the second layer 160 can be joined to form the second stack portion 325.

Figure 18:
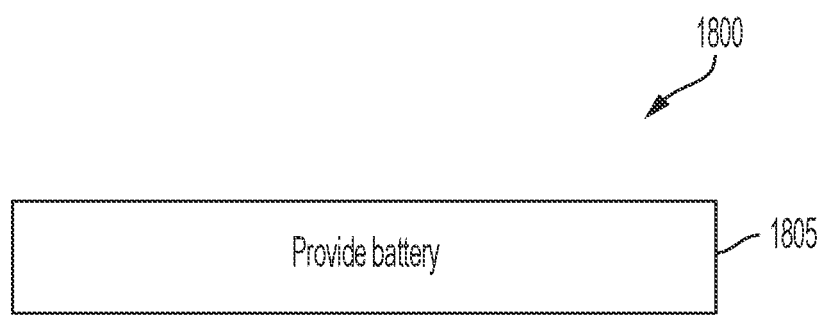
FIG. 18 is a flow diagram of an example method, in accordance with some aspects.

FIG. 18 depicts an example method 1800 of providing a battery at ACT 1805. For example, the battery can include a battery cell 820 that includes a first layer 145, a second layer 160, and a third layer 150. The first layer 145 can be a first electrode layer. The first layer 145 can comprise a battery active material. The first layer 145 can comprise a cathode electrode. The second layer 160 can be a second electrode layer. The second layer 160 can comprise a battery active material. The second layer 160 can comprise an anode electrode. The third layer 150 can be a third electrode layer. The third layer 150 can comprise a battery active material. The third layer 150 can comprise a cathode electrode. The first layer 145 and the third layer 150 can be disconnected or discontinuous. For example, the first layer 145 can be separate layer from the third layer 150, where each of the first layer 145 and the third layer 150 include a length, width, and thickness. The second layer 160 can be a continuous sheet (e.g., layer, web, etc.) that is provided via the roll 161. The second layer 160 can include the first portion 315 and the second portion 335. Each of the first portion 315 and the second portion 335 of the second layer 160 can be approximately the same size or greater than the dimensions of the first layer 145 or the third layer 150.

The first layer 145 and the first portion 315 of the second layer 160 can be indirectly (e.g., with intervening layers) or directly joined to form the first stack portion 305. For example, the first layer 145 could be joined with the first portion 315 of the second layer 160 with adhesive, heat, liquid surface tension, or some combination thereof. The third layer 150 and the second portion 335 of the second layer 160 can be directly or indirectly (e.g., with intervening layers) joined to form the second stack portion 325. For example, the third layer 150 could be joined with the second portion 335 of the second layer 160 with adhesive, heat, liquid surface tension, or some combination thereof. The first portion 315 and the second portion 335 of the second layer 160 can be continuous or connected. For example, the first portion 315 of the second layer 160 can be continuous with the second portion 335 of the second layer 160 such that the first portion 315 and the second portion 335 are sections of a continuous sheet comprising the second layer 160.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a first platen configured to rotate in a first direction, the first platen including a first surface configured to support a first electrode layer and contact a first portion of a second electrode layer;
a second platen configured to rotate in a second direction, the second platen including a second surface that mates with the first surface of the first platen to stack the first electrode layer and the first portion of the second electrode layer;
a third platen configured to rotate in the second direction, the third platen including a first surface configured to support a third electrode layer and contact a second portion of the second electrode layer; and
the first platen including a second surface that mates with the first surface of the third platen to stack the third electrode layer and the second portion of the second electrode layer to form a second stack portion, wherein the second electrode layer is an anode and the third electrode layer is a cathode.

2. The system of claim 1, wherein the first electrode layer is a singulated layer, wherein the first platen comprises a raised edge, and wherein an edge of the first electrode layer contacts the raised edge.

3. The system of claim 1, comprising:
a pump configured to create a vacuum;
the first platen defining an aperture fluidly coupled with the pump; and
the aperture positioned to apply the vacuum to a surface of the first electrode layer.

4. The system of claim 1, comprising:
the first platen and the second platen comprising a friction-reducing material.

5. The system of claim 1, wherein the first electrode layer is a cathode, comprising:
the second surface of the second platen mates with the first surface of the first platen to stack the first electrode layer, a first portion of a first separator layer, and the first portion of the second electrode layer.

6. The system of claim 1, wherein the second surface of the second platen mates with the first surface of the first platen to stack the first electrode layer, a first portion of a separator layer, the first portion of the second electrode layer, and a first portion of a second separator layer to form a first stack portion.

7. A system, comprising:
a first platen configured to rotate in a first direction, the first platen including a first surface configured to support a first electrode layer and contact a first portion of a second electrode layer;
a second platen configured to rotate in a second direction, the second platen including a second surface that mates with the first surface of the first platen to stack the first electrode layer and the first portion of the second electrode layer;
a third platen configured to rotate in the second direction, the third platen including a first surface configured to support a third electrode layer and contact a second portion of the second electrode layer; and
the first platen including a second surface that mates with the first surface of the third platen to stack the third electrode layer and the second portion of the second electrode layer, wherein the second portion of the second electrode layer is continuous with the first portion of the second electrode layer.

8. A system, comprising:
a first platen configured to rotate in a first direction, the first platen including a first surface configured to support a first electrode layer and contact a first portion of a second electrode layer;
a second platen configured to rotate in a second direction, the second platen including a second surface that mates with the first surface of the first platen to stack the first electrode layer and the first portion of the second electrode layer;
the first electrode layer and the first portion of the second electrode layer are stacked to form a first stack portion;
a third platen that rotates in the second direction, the third platen including a first surface configured to support a third electrode layer and contact a second portion of the second electrode layer; and
the first platen including a second surface that mates with the first surface of the third platen to stack the third electrode layer and the second portion of the second electrode layer and form a second stack portion continuous with the first stack portion.

9. The system of claim 1, comprising:

the second surface of the second platen mates with the first surface of the first platen to stack the first electrode layer, a first portion of a first separator layer, the first portion of the second electrode layer, and a first portion of a second separator layer to form a first stack portion; and the first platen including the second surface that mates with the first surface of the third platen to stack the third electrode layer, a second portion of second separator layer, the second portion of the second electrode layer, a second portion of a first separator layer to form the second stack portion, wherein the first portion of the second electrode layer is continuous with the second portion of the second electrode layer.

10. The system of claim 1, comprising:

the second surface of the second platen mates with the first surface of the first platen to stack the first electrode layer, a first portion of a first separator layer, the first portion of the second electrode layer, and a first portion of a second separator layer to form a first stack portion;

the first platen including the second surface that mates with the first surface of the third platen to stack the third electrode layer, a second portion of a second separator layer, the second portion of the second electrode layer, a second portion of a first separator layer to form the second stack portion connected the first stack portion; and a receptacle to collect the first stack portion and the second stack portion.

11. The system of claim 1, comprising:

the second surface of the second platen mates with the first surface of the first platen to stack the first electrode layer, a first portion of a first separator layer, the first portion of the second electrode layer, and a first portion of a second separator layer to form a first stack portion;

the first platen including the second surface that mates with the first surface of the third platen to stack the third electrode layer, a second portion of the second separator layer, the second portion of the second electrode layer, a second portion of a first separator layer to form the second stack portion connected with the first stack portion; and a fourth platen to rotate in the first direction, the fourth platen including a first surface to hold a fourth electrode layer and contact a third portion of the second electrode layer, the first surface of the fourth platen to mate with a second surface of the third platen to stack the fourth electrode layer, a third portion of the first separator layer, the third portion of the second electrode layer, and a third portion of the second separator layer to form a third stack portion.

12. The system of claim 1, comprising:

the second surface of the second platen mates with the first surface of the first platen to stack the first electrode layer, a first portion of a first separator layer, the first portion of the second electrode layer, and a first portion of a second separator layer to form a first stack portion;

the first platen including the second surface that mates with the first surface of the third platen to stack the third electrode layer, a second portion of the second separator layer, the second portion of the second electrode layer, a second portion of a first separator layer to form the second stack portion connected with the first stack portion;

a fourth platen to rotate in the first direction, the fourth platen including a first surface configured to support a fourth electrode layer and contact a third portion of the second electrode layer, first surface of the fourth platen to mate with a second surface of the third platen to stack the fourth electrode layer, a third portion of the first separator layer, the third portion of the second electrode layer, and a third portion of the second separator layer to form a third stack portion;

a first receptacle to collect the first stack portion and the second stack portion; and a second receptacle to collect the third stack portion.

* * * * *